(12) United States Patent
Cipolla et al.

(10) Patent No.: US 6,272,287 B1
(45) Date of Patent: *Aug. 7, 2001

(54) METHOD FOR HANDLING FILM CUSTOMIZATION DATA AND SYSTEM

(75) Inventors: David Cipolla, Macedon; David C. Smart, Fairport, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,340

(22) Filed: Dec. 28, 1998

(51) Int. Cl.[7] .................................................. G03B 17/24
(52) U.S. Cl. .............................. 396/6; 396/311; 396/429
(58) Field of Search .............................. 396/6, 207, 208, 396/210, 211, 311, 429

(56) References Cited

U.S. PATENT DOCUMENTS

| | | | |
|---|---|---|---|
| 4,806,958 | 2/1989 | Momot et al. | 396/208 |
| 4,965,626 | 10/1990 | Robison et al. | 355/40 |
| 5,032,855 | 7/1991 | Taniguchi et al. | 396/60 |
| 5,142,310 | 8/1992 | Taniguchi et al. | 396/60 |
| 5,208,621 | 5/1993 | Taniguchi et al. | 396/60 |
| 5,300,974 | 4/1994 | Stephenson, III | 396/311 |
| 5,455,648 | 10/1995 | Kazami | 396/310 |
| 5,504,583 | 4/1996 | Jamzadeh et al. | 358/302 |
| 5,546,145 | 8/1996 | Bernardi et al. | 396/312 |
| 5,587,752 | 12/1996 | Petruchik | 396/315 |
| 5,606,365 | 2/1997 | Maurinus et al. | 348/222 |
| 5,619,738 | 4/1997 | Petruchik et al. | 396/311 |
| 5,701,529 | 12/1997 | Yokonuma et al. | 396/310 |
| 5,701,530 | 12/1997 | Fujino | 396/311 |
| 5,710,618 | 1/1998 | McIntyre | 355/40 |
| 5,726,737 | 3/1998 | Fredlund et al. | 355/40 |
| 5,758,216 | 5/1998 | Arnold | 396/311 |
| 5,761,558 | 6/1998 | Patton et al. | 396/429 |
| 5,799,219 | 8/1998 | Moghadam et al. | 396/319 |
| 5,808,723 | * 9/1998 | Klees | 396/311 |
| 5,819,126 | * 10/1998 | Kitagawa et al. | 396/319 |
| 5,963,752 | * 10/1999 | Zander | 396/429 |

FOREIGN PATENT DOCUMENTS

| | | |
|---|---|---|
| 0 851 274 A1 | 7/1998 | (EP) . |
| 0 851 661 A2 | 7/1998 | (EP) . |
| 10-115874 | 5/1998 | (JP) . |

* cited by examiner

*Primary Examiner*—David M. Gray
(74) *Attorney, Agent, or Firm*—Robert Luke Walker

(57) ABSTRACT

In a method and system for handling photofinishing customization data for a film unit having a unique identifier, a logical memory unit is allocated to the film unit. The logical memory unit is remote from the film unit. The logical memory unit has the identifier and a plurality of photofinishing parameters for the film unit. Changes in the photofinishing parameters are written in the logical memory unit from remote input.

17 Claims, 24 Drawing Sheets

METHOD FOR HANDLING FILM CUSTOMIZATION DATA AND SYSTEM

CROSS REFERENCE TO RELATED APPLICATIONS

Reference is made to commonly assigned co-pending U.S. patent applications Ser. No. 09/221,341, entitled: METHOD FOR ASSOCIATING A FILM UNIT AND A ONE-TIME USE CAMERA, and filed in the names of David Cipolla and David C. Smart; Ser. No. 09/221,358, entitled: PHOTOFINISHING METHOD, PHOTOFINISHNG APPARATUS, AND SYSTEM, and filed in the names of David C. Smart and David Cipolla; Ser. No. 09/221,247, entitled: METHOD FOR STORING EXPOSURE DEPENDENT AND EXPOSURE INDEPENDENT INFORMATION RELATED TO A PHOTOGRAPHIC FILM UNIT, and filed in the names of David C. Smart and David Cipolla; Ser. No. 09/221,943, entitled: FILM UNIT, METHOD FOR ENABLING SECURE CUSTOMIZATION OF A FILM UNIT, AND SYSTEM, and filed in the names of David C. Smart and David Cipolla; Ser. No. 09/221,942, entitled: IMAGE CAPTURE PACKAGE SECURE DATABASE ACCESS METHOD, and filed in the names of David C. Smart and David Cipolla; Ser. No. 09/221,424, entitled: METHOD FOR HANDLING USER AND PRODUCER FILM UNIT CUSTOMIZATION DATA AND SYSTEM, and filed in the names of David Cipolla, David C. Smart, and Robert Luke Walker; Ser. No. 09/221,420, entitled: METHOD FOR COMPENSATING FOR FILM UNIT DEFECTS AND SYSTEM, and filed in the names of David C. Smart and David Cipolla; Ser. No. 09/221,425, entitled: METHOD FOR KEEPING PHOTOGRAPHIC FILM CURRENT, and filed in the names of David C. Smart, David Cipolla, and David A. Hodder; Ser. No. 09/221,756, entitled: METHOD FOR TRACKING THE LIFE CYCLE OF FILM UNITS AND SYSTEM, and filed in the names of David Cipolla and David C. Smart; Ser. No. 09/221,249, entitled: METHOD FOR ARCHIVING FILM UNIT INFORMATION, and filed in the names of David C. Smart and David Cipolla, each of which are assigned to the assignee of this application. The above cross-referenced applications are hereby incorporated herein by reference.

FIELD OF THE INVENTION

The invention relates to photography and more particularly relates to a method and system for handling film customization data.

BACKGROUND OF THE INVENTION

Through the years, one of the great satisfactions of photography has been the ability to make many different kinds of final images from a captured image. On the other hand, the manual efforts required and costs involved have generally limited most people to a small number of standard photographic features. The number of features readily and cheaply available has gradually increased over time. Photofinishing originally required manual input at every stage, but automation has gradually had some effect; initially in the detection of film type from machine readable encodements for sorting purposes.

The use of encodements to provide features like zooming and cropping have been taught, for example, in U.S. Pat. Nos. 4,650,304; 4,583,831; 5,059,993; 5,619,738; and 5,132,715. The Advanced Photo System™ (ADVANCED PHOTO SYSTEM™) has implemented the use of encodements on film to automatically print images in different formats and magnifications, to print various exposure related information on film, and to adjust for lighting conditions at the time of exposure.

Other uses of encodements have also been described. U.S. Pat. No. 5,758,216 discloses photography systems, film units, and cameras in which a one-time use camera or film unit bears external indicia of a special promotion and the enclosed film has a corresponding magnetic encodement. Disclosed special promotions include photomontages (composite images) with pre-exposed or digitally superimposed cartoon characters and other symbols, super saturated color processing and enhanced size prints. U.S. Pat. No. 5,726,737 discloses photography systems, film units, and cameras in which a one-time use camera or film unit bears external indicia of a preferential subject matter; such as action shots, scenic shots, and close-ups; and the enclosed film has a corresponding magnetic encodement. U.S. Pat. No. 5,758,216 and U.S. Pat. No. 5,726,737 disclose modifications of the entire image to provide for super saturated prints and preferential subject matter respectively. U.S. Pat. No. 5,461,440 discloses an image modification that uses an encodement on film and corrects for particular image quality degradations. U.S. Pat. No. 5,323,204 discloses use of an encodement to provide changes in aspect ratio and indicates that encodements might permit enhancement of image quality beyond negative quality to compensate for film or camera based limitations, artifacts, or errors. Examples of enhancements are noise suppression, sharpness enhancement, and tone scale modification.

The nature of the encodement itself, that is, the media used and the change in that media, has varied greatly. Encodements that are unchanged for a particular film type are generally provided as a permanent feature of the film, or film container, or both. For example, Type 135 film canisters have a pattern of electrically conductive and non-conductive patches. Encodements for variable features must be provided in another manner. U.S. Pat. No. 4,678,300 teaches an encodement in the form of a scratch on the outside of a film container. In the ADVANCED PHOTO SYSTEM™, encodements for are exposed spots on film or recordings on a magnetic layer. U.S. Pat. No. 4,500,183 discloses storage of "flag data" and other information on a magnetic disk or portion of a film cassette or on a random access semiconductor memory ("RAM") contained in a film cassette. U.S. Pat. No. 5,036,344 discloses the use of a film camera having an "IC card" that includes semiconductor memory, a microcomputer, and the like. The card provides continuous access to the information.

The various encodement media discussed above, with the possible exception of scratching the container, all add cost to the film unit. The cost tends to increase with an increase in storage capacity, and applies to all units, whether the storage capacity is used or not.

U.S. Pat. No. 5,799,219 teaches remote communication of image data and other data recorded on photographic film for photofinishing. An order number is used. European Published Patent Application No. EP 0 860 980 A2 teaches the preparation by a user of a print order file which is then transmitted for photofinishing. U.S. Pat. No. 5,606,365 teaches a digital camera which transmits image information with a camera identification code to a networked computer system for processing using correction maps specific to that camera. U.S. Pat. No. 5,765,042 teaches a one-time use camera having a film unit identification number printed on the outside.

It would thus be desirable to provide a method and system for storing and accessing information relating to a film unit without requiring the information to be stored in or with the film unit.

SUMMARY OF THE INVENTION

The invention is defined by the claims. The invention, in its broader aspects, provides a method and system for handling photofinishing customization data for a film unit having a unique identifier, a logical memory unit is allocated to the film unit. The logical memory unit is remote from the film unit. The logical memory unit has the identifier and a plurality of photofinishing parameters for the film unit. Changes in the photofinishing parameters are written in the logical memory unit from remote input.

It is an advantageous effect of embodiments of the invention that a method and system are provided that allow for storing and accessing information relating to a film unit without requiring the information to be stored in or with the film unit.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
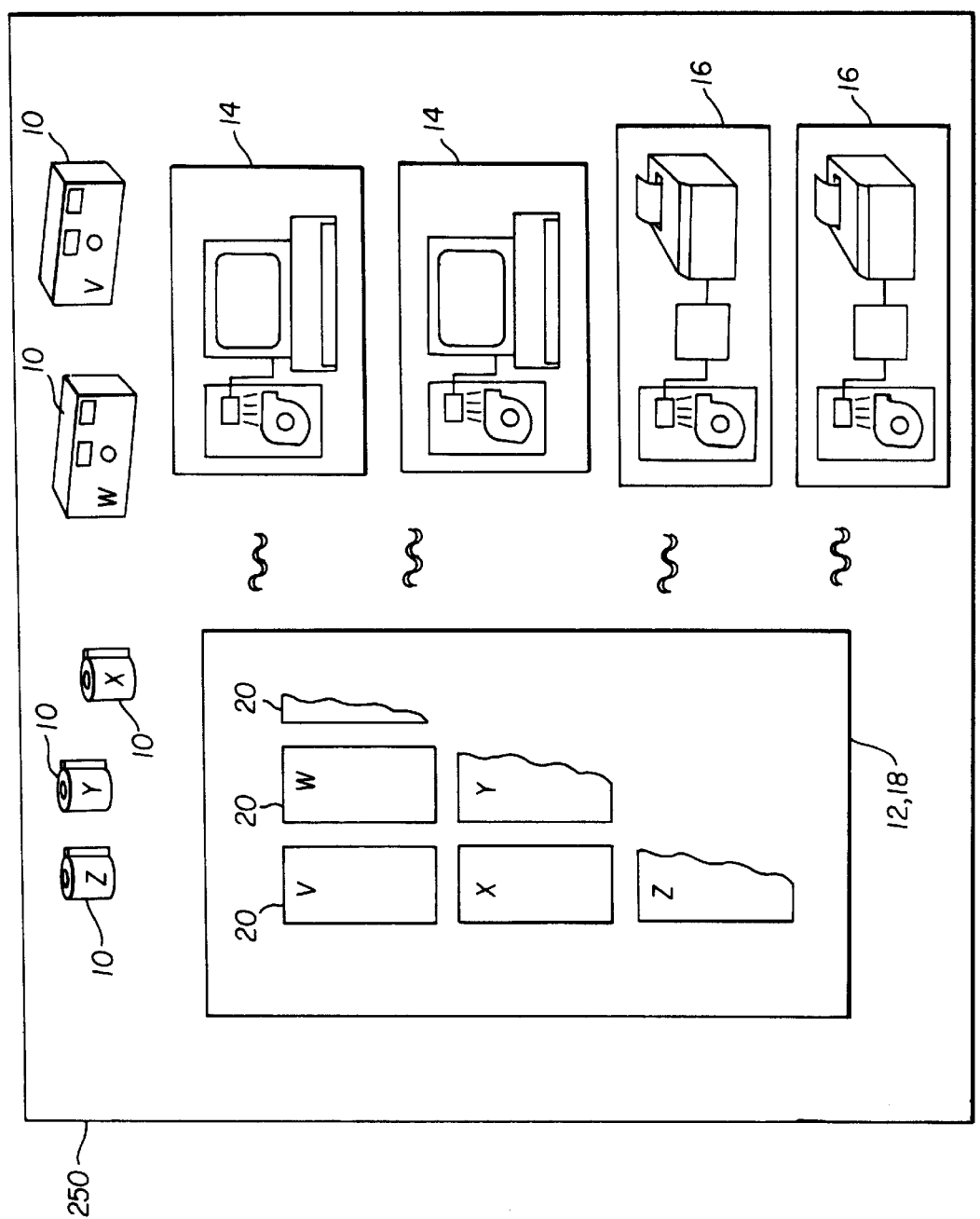
FIG. 1 is diagrammatical view of an embodiment of a system of the invention.

Referring to FIG. 1, a photography system 250 includes a plurality of film units 10, a look-up table 12, and one or more photofinishing units 14.(The systems, methods, and apparatus disclosed herein all have common features and specific embodiments can each include some or all of the features discussed herein, except where, as will be apparent from the specification, specific features cannot be combined. Reference should thus be made to the figures generally in relation to each embodiment.) The system preferably includes one or more input devices 16. The look-up table 12 is provided as a portion of memory in one or more computing devices 18. Logical memory units 20 in the look-up table 12 are allocated to each film unit 10 to hold data for that film unit 10. The look-up table 12 is accessible via the input device 16 and photofinishing units 14.

A film unit 10 is customized by remotely accessing the look-up table 12 and changing the data in the respective logical memory unit 20. The customization modifies the photofinishing of the film unit 10 to change the resulting photofinishing product 22. The customization can add, remove, or change one or more features to provide a wide variety of different combinations. The film unit 10 itself is only modified indirectly, since the customized features are only manifest after photofinishing.

The term "photofinishing" is used herein to refer to one or more physical, chemical, optical, and digital techniques used to visualize, print, or modify an image so as to produce a "final image", which is a printed or displayed image or a digital image that is printable or displayable. Photofinishing thus includes such techniques as chemical development and digital image modification and printing. Photofinishing can be provided repeatedly for a film unit, but the repetitions may or may not repeat the same techniques. For example, an initial photofinishing of a photographic film type film unit will include chemical development. Later photofinishing of the same film unit will not. A "photofinishing unit" is a device or group of devices providing a photofinishing function.

The term "film unit" is used herein to refer to media on which image data is or can be stored for archival purposes, with or without media modification, and physically associated features supporting use of the media. Each film unit 10 stores or can store a plurality of archival images. In a film-type film unit 10, the media is a photographic filmstrip 36. The support structure of a film-type film unit 10 can include a spool on which the filmstrip 36 is wound and canister 38 enclosing the filmstrip 36 and spool. The support structure can also include the features of a one-time use camera 24.

Figure 3:
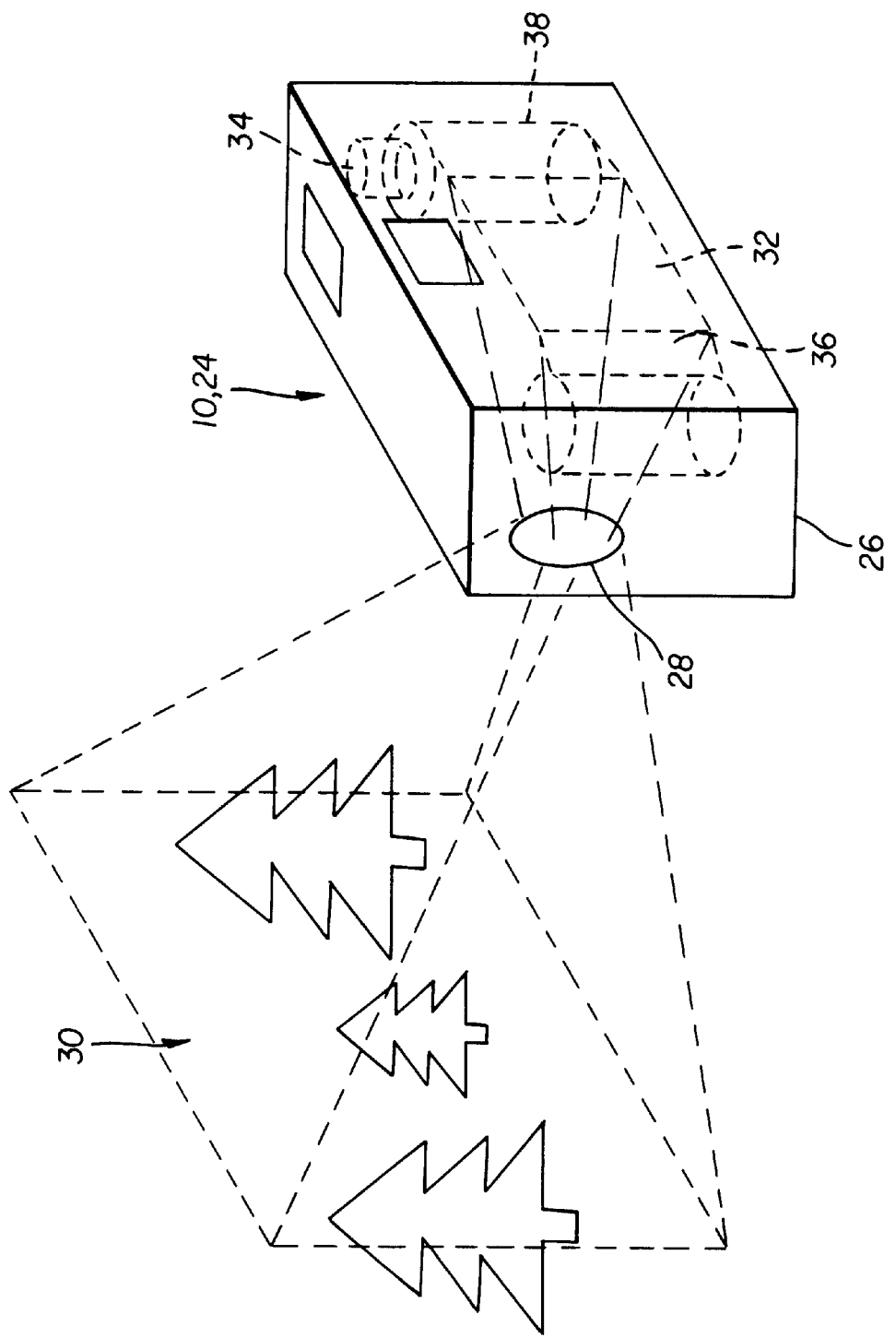
FIG. 3 is a diagrammatical perspective view of an embodiment of a one-time use camera of the system of FIG. 1 being used to photograph trees.

The term "one-time use camera" is used herein to refer to cameras that are provided to consumers in preloaded form and cannot be reloaded, by the consumer, without extensive camera disassembly, or replacement of parts, or use of special tools, or the like. One-time use film cameras are widely available at this time. FIG. 3 illustrates a one-time use camera 24. Each camera 24 has a camera body 26 and an imaging system including a taking lens 28 that images the subject matter photographed 30 on an image plane 32 in the case. The imaging system includes a film transporter 34 (illustrated in this figures diagrammatically as a cylinder) that transports photographic filmstrip 36, frame by frame, through the image plane 32. The filmstrip 36 captures and stores light images as latent images on respective frames of film. In a digital film unit 10, images are stored in digital form in a memory card or floppy disk or other magnetic, electronic, optical or other memory device. Digital one-time use cameras are limited at this time, for cost reasons, to use in controlled situations in which it can be assured that the used camera will be returned to the dealer or producer for reloading, such as camera rental.

The invention is generally discussed herein in terms of film units 10 that are one-time use photographic film cameras 24. It will be understood that equivalent considerations apply to other types of film units. The film unit 10 is also generally discussed herein in terms of the same media being used for both capture and storage of archival image information. It should be understood that stored images may, in some cases, be transferred to a replacement medium or film unit 10, one or more times. The supporting features may change during the life of the film unit. For example, a film unit 10 can start out with the features of an Advanced Photo System one-time use photographic film camera 24. After film exposure, the camera body 26 is removed; the filmstrip 36 is removed from its canister 38 and developed, and is later returned to the film canister 38. This film unit 10 is then retained as a cassette 40 of developed film, with the filmstrip 36 being temporarily extracted for preparation of photographic prints or other final images as needed. The stored images are generally treated herein as being realistic images of the subject photographed and having the same information content as latent images, and later, as developed images. It will be understood that this is a simplification provided as a matter of convenience for explanatory purposes and that stored images will differ from reality in manners well known to those of skill in the art. For example, the stored images must differ from the original light image, since the stored images are subject to the limitations of the imaging system and the media. Film images are subject to limitations such as grain size. Digital images are necessarily pixellated and commonly have color values partially extrapolated from neighboring pixels. Digital images may also be subject to enhancement modification between capture and storage, for example, to extrapolate values for pixels degraded by sensor defects. Latent images on film are subject to the chemical and physical effects of processing. Images are generally stored in a non-realistic form that requires modification to render the images viewable. For example, photographic print film stores images as negatives. Digital images must be displayed or printed and may require other modification, such as decryption or modification for a particular display device. Captured images may also be subject to deliberate modification by the user at the time of capture. For example, an image may be modified by use of a colored filter.

Each film unit 10 bears its unique identifier 42 (represented in FIGS. 1a–1c by the letters "X", "Y", and "Z"). The identifier 42 is used to locate the logical memory unit 20 associated with a particular film unit 10. The identifier 42 is a number or other alphanumeric or non-alphanumeric sequence or arrangement which may or may not be human readable or machine-readable using a standardized encodement scheme, such as a standard one- or two-dimensional bar code. A particular identifier 42 is inclusive of the specific sequence or arrangement and its cognates. A cognate is a product of a mathematical function, such as an encryption or decryption function, or other translation, applied to the sequence or arrangement. A film unit 10 may bear multiple copies of a sequence or arrangement and any cognates. The term "identifier 42" is inclusive of such multiple copies, but an identifier 42 can be read, without necessarily reading each copy of multiple copies.

The identifier 42 can be recorded on the exterior of the film unit 10 in human-readable form 44 or publicly available, standardized-machine readable form 46. The identifier 42 can be recorded on the film unit 10 in a non-public machine-readable form 46. The identifier 42 can have multiple parts with one part recorded one way and another part recorded another way. It is convenient that the film unit 10 have an easily readable designation (also referred to herein as a "label number") on the exterior that can be used in the way serial numbers are used now, for example, to relate film cassettes 40 with index prints. The label number can be used as the identifier 42. This is convenient if the input device 16, discussed in detail below, requires the user to key in the identifier 42.

With a one-time use camera 24, the identifier 42 is carried by the cassette 40, and also by the camera body 26. The filmstrip 36 within a film cassette 40 may also carry the identifier 42. It is highly preferred that the identifiers 42 discussed herein be fully unique, that is, each identifier 42 is not repeated and each identifier 42 is limited to a single film unit 10 and a single associated logical memory unit 20. Unique identifiers 42 can be readily provided by use of non-repeating sequences of numbers or codes. If different producers are likely to use the same numbers, then it is also desirable that producer identification also be included in the identifiers 42 to ensure uniqueness.

The identifier 42 is printed on a film unit 10 or recorded in some other manner, such as digital recording on an area of magnetic or optical recording media. The identifier 42 is human or machine-readable or both prior to exposure of images. It is preferred that the identifier 42 be recorded independently of the storage of image information, to reduce the risk of damage to the film unit 10 or loss of captured image information or carrying capacity of the film unit 10 when the identifier 42 is read. For example, printing an identifier 42 on the exterior of a film cassette 40 is desirable, since the identifier 42 can be read independently of the filmstrip 36 inside. Providing an identifier 42 only as a latent image on the leader of a filmstrip 36 within a cassette 40 is not desirable. Theoretically, the leader of the filmstrip 36 could be developed separately before film exposure to allow reading of the identifier 42, but degradation of the film unit 10 would be likely.

An identifier 42 that is readable before and after exposure of images is preferred. For example, a Type 135 film cassette can bear a printed identifier 42 on the exterior and a Type 120 film roll can bear a printed identifier 42 on the leading and trailing ends of the paper backing. Both identifiers 42 can be read, before or after film exposure. With some types of film unit 10, the identifier 42 is readable before and after film exposure and is also readable during exposure of images. A simple example is an Advanced Photo System™ cassette bearing a printed identifier on the exterior of the cassette. In an appropriate camera having mid-roll film exchange, the film cassette can be unloaded and reloaded at any time.

If the film unit 10 is a one-time use camera 24, it is highly desirable that the identifier 42 be accessible from the exterior of the camera body 26, prior to film developing, and be accessible from the exterior of the film cassette 40 after film developing. It is also desirable that the identifier 42 be destroyed at the time of film development so that there is no risk that the wrong identifier 42 might be retained on a reloaded one-time use camera body 26. A solution is to record separate copies of the identifier 42 on the film cassette 40 and camera body 26. The copy on the camera body 26 can be recorded as disclosed in U.S. Pat. No. 5,765,042, such that the identifier 42 is destroyed when the exposed film cassette 40 is removed from the camera body 26. When the one-time use camera body 26 is reloaded, the process is repeated and a copy of a new identifier 42 is placed on the camera body 26.

Figure 6:
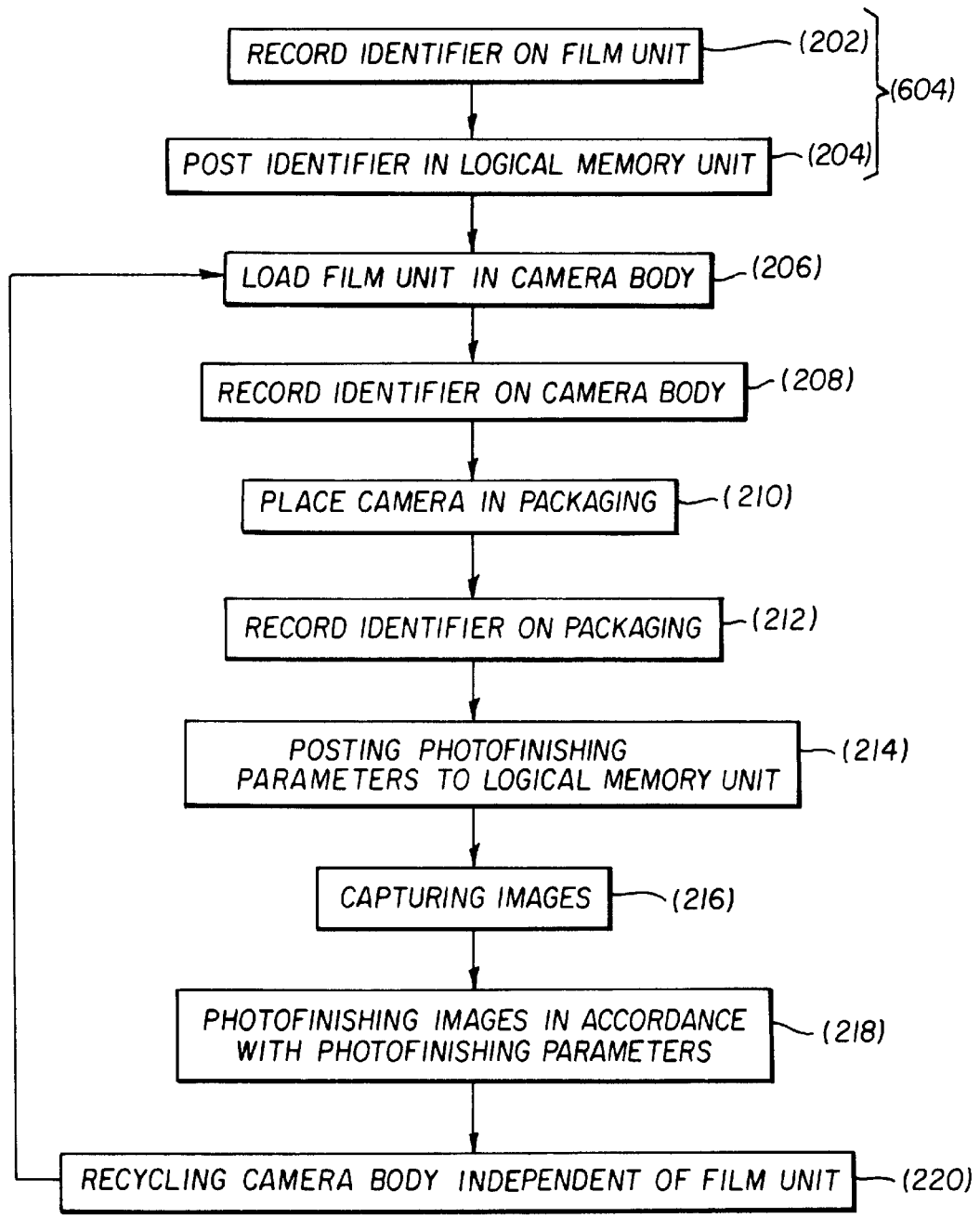
FIG. 6 is a diagram of an embodiment of a method for associating a film unit and a one-time use camera.

Referring to FIG. 6, the identifier is recorded (202) on the film unit 10. A logical memory unit 20 is associated (204) with that identifier 42 as described elsewhere herein. The film unit 10 is loaded (206) in a camera body 26 and the identifier 42 is recorded (208) on the camera body 26. The camera 24 is placed (210) in packaging 50 and the identifier 42 is recorded (212) on the packaging 50. Photofinishing parameters 52 are written (214) to the logical memory unit 20, images are captured (216), and the images are processed (218) in accordance with the parameters 52, as in one or more of the methods disclosed herein. The camera body 26 can then be recycled (220) with a new film unit. As a part of recycling, the original identifier 42 is destroyed on the camera body 26, for example, by grinding up a cover panel (not separately illustrated) that includes the identifier and recycling the remainder of the body without the cover panel.

The identifier 42 can be provided both on the film unit 10 and on the exterior of packaging 50 for the film unit 10 to permit customization without removal of the film unit 10 from the packaging 50.

The term "look-up table" refers to both a complement of logical memory in one or more computing devices 18 and to necessary equipment and software for controlling and providing access to the logical memory.

The term "logical memory unit" refers to a portion of the logical memory allocated to an individual film unit 10 and is inclusive of hardware and software in the same manner as "look-up table".

The identifiers 42 are used in the look-up table 12 to identify corresponding logical memory units 20. The relationship between an identifier 42 and the associated logical memory unit 20 in the look-up table 12 can be direct; for example, the logical memory unit 20 can bear, in compressed or uncompressed digital form, the identifier 42 for the associated film unit 10, or the identifier 42 can be a pointer to an address for the logical memory unit 20. The relationship between the identifier 42 and associated logical memory unit 20 can be indirect. The identifier 42 can be distinguished by the structure of a database or by a memory address path, or the relationship between parts of the identifier 42 and a logical memory unit 20 can be distributed. For example, a logical memory unit 20 could have the numeral three to identify a particular hard disk array, 6 to identify a hard disk, 9 to identify a logical array, data structure or file, and so on. As another example, an identifier 42 can point to a database element, which can point to an element in another database, and so on. In a particular embodiment, the look-up table 12 is structured to associate sequential identifiers 42 with sequential table elements. These approaches can be combined and individual elements can be in the same physical component or multiple components in diverse locations can used by means of one or more networks.

The allocation of the logical memory unit 20 can be limited to setting aside enough available memory to accommodate data for the film unit 10. The memory set aside does not have to initially include any information about the film unit 10. It is preferred, however, that the logical memory units 20 be allocated by creating the logical memory units 20 in the form of individual files or entries. It is further preferred that the identifiers 42 be written to the logical memory units 20 for the respective film units 10 or that the look-up table 12 be structured to indicate the identifiers 42 for the respective logical memory units 20, when the logical memory units 20 are allocated. The identifiers 42 can be written or look-up table 12 be restructured later, when needed; but this is less controllable and thus likely to increase the risk of erroneous entries or misallocations. The writing of identifiers 42 during allocation of logical memory units 20 also ensures that every film unit 10 has, at all times, at least one photofinishing parameter 52 in the look-up table 12. The identifier 42 on a film unit 10 can be compared with the identifiers 42 in the look-up table 12 to determine if there is an irregularity, such as a misreading of the identifier 42 due to damage to the film unit 10. It is convenient if the logical memory unit 20 is associated with the respective film unit 10 in lock-step with the recording of the identifier 42 on the film unit 10. This assures that involved logical memory units 20 can be easily identified when there is a breakdown in allocating or identifier 42 printing or the like.

The memory allocations for individual film units 10 can be created at the same time or before those film units 10 are made or creation of the 10 respective logical memory units 20 can be delayed up until the time that the film units 10 are first customized. Logical memory units 20 can be provided as portions of physical memory of fixed size, but this is wasteful of resources. Many film units 10 are unlikely to be customized and thus much space in memory allocations would never be used. It is preferable to adjust the size of logical memory units 20 as needed. Many computer operating systems include a file system, such as a file-allocation-table that adjusts file sizes in this manner. The look-up table 12 can utilize such an operating system and provide each memory allocation as a separate file. This approach is workable, but is non-optimal in terms of access time, memory usage, and security. It is preferred that the memory allocations be handled by database management software. Access to the database can be provided by the database management system or through a generalized query language such as SQL (Structured Query Language).

The logical memory units 20 are maintained for a set time or indefinitely. Space required for the logical memory units 20 in the look-up table 12 can be reduced by limiting the scope of recorded photofinishing parameters 52 to deviations from default values. In other words, the absence of an entry in the logical memory unit 20 for a particular processing parameter signifies a default value for that parameter. With a large number of film units 10, the space saved is likely to be very great, since many film units 10 will never be customized and many photofinishing parameters 52 for customized film units 10 will remain at default values.

The look-up table 12 is remote from the film units 10 during the use of the film units 10. Thus, the physical components of the look-up table 12 are not internal to the film units 10 and are not portable with the film units 10. The look-up table 12 can be directly connected to, or a part of, one of the photofinishing units 14; but it is preferred that the look-up table 12 is also remote from the photofinishing units 14. The look-up table 12 is preferably a networked computer or system of computing and information storage devices. For simplicity, the look-up table 12 is generally referred to herein as a single networked computer.

Remote access to the look-up table 12 is provided for the film units 10, by means of input devices 16. The photofinishing units 14 can also remotely access the look-up table 12. The input device 16 and film unit 10, can write to, and preferably read from, a respective logical memory unit 20.

The photofinishing units 14 can read from a logical memory unit 20 for a particular film unit 10 and, preferably, can write some information to the logical memory unit 20, such as a parameter that indicates the film unit 10 has been processed. It is preferred that the logical memory unit 20 be repeatedly writable by an input device 16 and by photofinishing units 14. All information written to the logical memory unit 20 can be permanently recorded, or some or all information in a logical memory unit 20 can be made erasable. It is currently preferred that information written by an input device 16 not be erasable by a photofinishing unit 14 and vice versa It is preferred that the look-up table 12 be accessible on a substantially continuous basis, like the service provided by public utilities. In other words, service is always available, or at the least is available on a regular schedule, subject only to unavoidable exigencies, such as natural disasters and other calamities.

Figure 4:
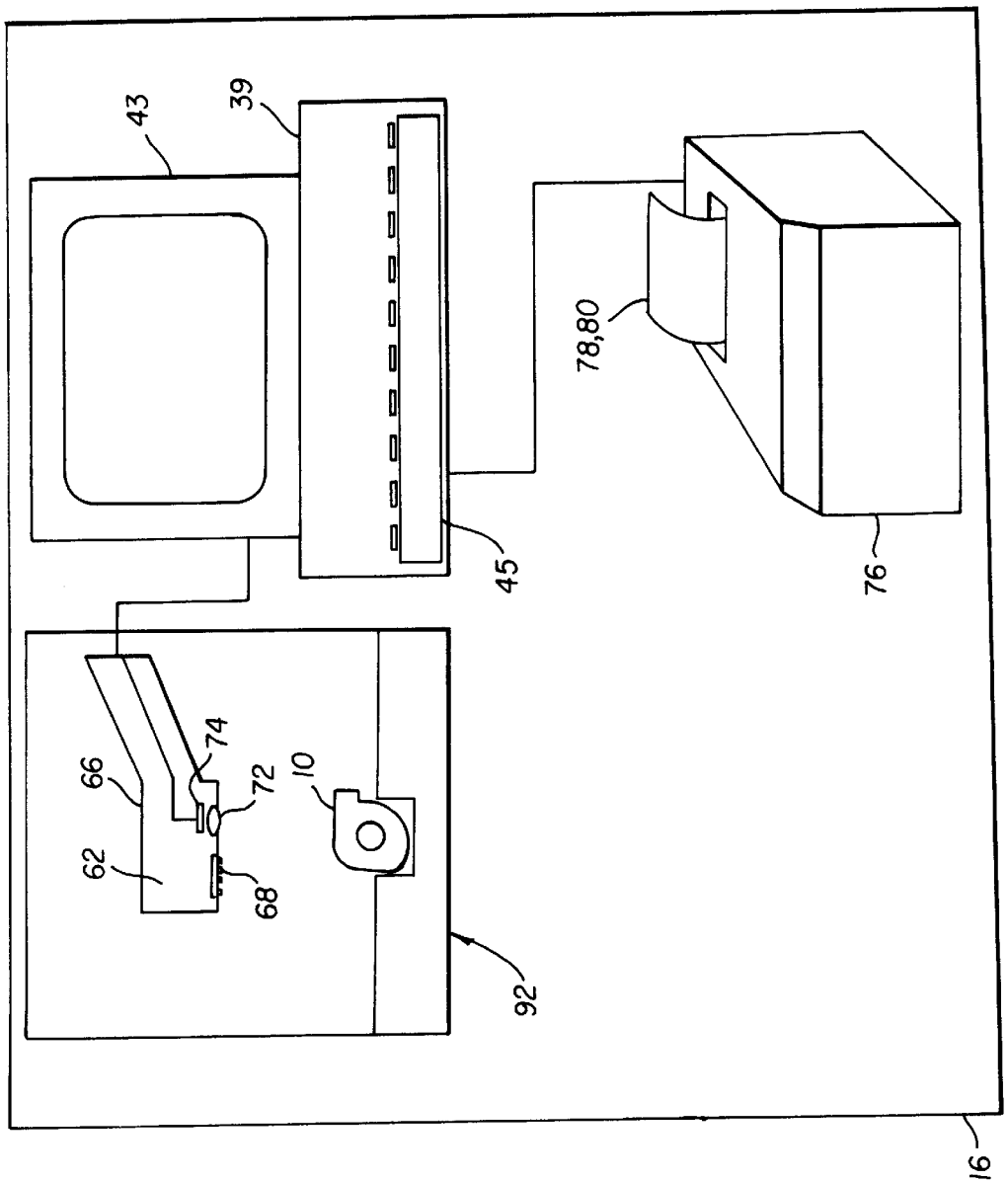
FIG. 4 is a diagrammatical view of an embodiment of the input device of the system of FIG. 1.

The input devices 16 are used to customize the film units 10 by changing the data in respective logical memory units 20. The input device 16 communicates the respective identifier 42 and a desired customization to the look-up table 12. (Communication is symbolized in the figures as a sinusoidal wave.) The input device 16 can be limited to a terminal including a controller 39 having a microprocessor or the like having a display 43 and a keyboard or other input means 45. In this case, the identifier 42 is manually input. Referring to FIG. 4, it is preferred that the input device 16 also includes a station 92 to receive the film unit 10 and a detector 62 disposed in the station 92 to read the identifier 42 from the film unit 10. This helps ensure that the photofinishing parameter 52 is provided for the correct film unit 10. Information can be manually fed into the input device 16 or can be provided by accessing a portable information storage device such as a smart card. In the latter case, the input device 16 must have an appropriate interface for the storage device. The user can also provide information by inputting a customer number or the like to access a database. The database can be in the input device 16 or can be remote. The information provided by the portable storage device can be limited to customer name, address, and account data or can also include user preferences for one or more other photofinishing parameters 52. The input device 16 can be a single purpose device or can be an appropriately configured personal computer and peripherals. The details of the station 92 and detector 62 depend upon the manner in which the identifier 42 is recorded. For example, if the identifier 42 is provided on the outside of a cassette 40 as a visible bar code 64, as shown in FIG. 4, then the detector 62 can be a hand-held bar code reader 66 and the remainder of the station 92 can be a support surface, preferably configured to dock the film unit 10, that is to receive and hold the film unit 10 in position. The bar code reader 66 has a light source 68, such as an array of light emitting diodes, and a detecting unit 70, such as a lens system 72 imaging on a two-dimensional charge coupled device 74. The input device 16 can also include a printer 76 to print information about the photofinishing parameters 52 on the film unit 10 or a sticker 78 or the like. The input device 16 can print a photofinishing envelope or can eliminate the need for a photofinishing envelope. It is preferred, at least in any case in which a photofinishing envelope is not used, that the input device 16 supply a receipt 80 to the user that documents the status of the film unit 10.

The interface and method of communication between the input device 16 and the look-up table 12 is not critical. For example, the input device 16 can incorporate and communicate via a dial-up modem or can communicate using a dedicated communication link or the Internet. The input device 16 could operate the look-up table 12 by remote control, but for reasons of security and convenience, it is highly preferred that the input device 16 act as a networked remote node.

Communication can be one-way (half duplex) or two-way (full duplex) from the input device 16 to the look-up table 12 and can immediately change the look-up table 12 or change the table on a delayed basis. One way communication presents a risk of errors due to communications problems, equipment breakdowns and the like. Delayed communication can resolve errors, but then requires multiple accesses for a single customization. It is highly preferred that communication be two-way and that all entries in the input device 16 be immediately confirmed as being received and entered by the look-up table 12.

Figure 5:
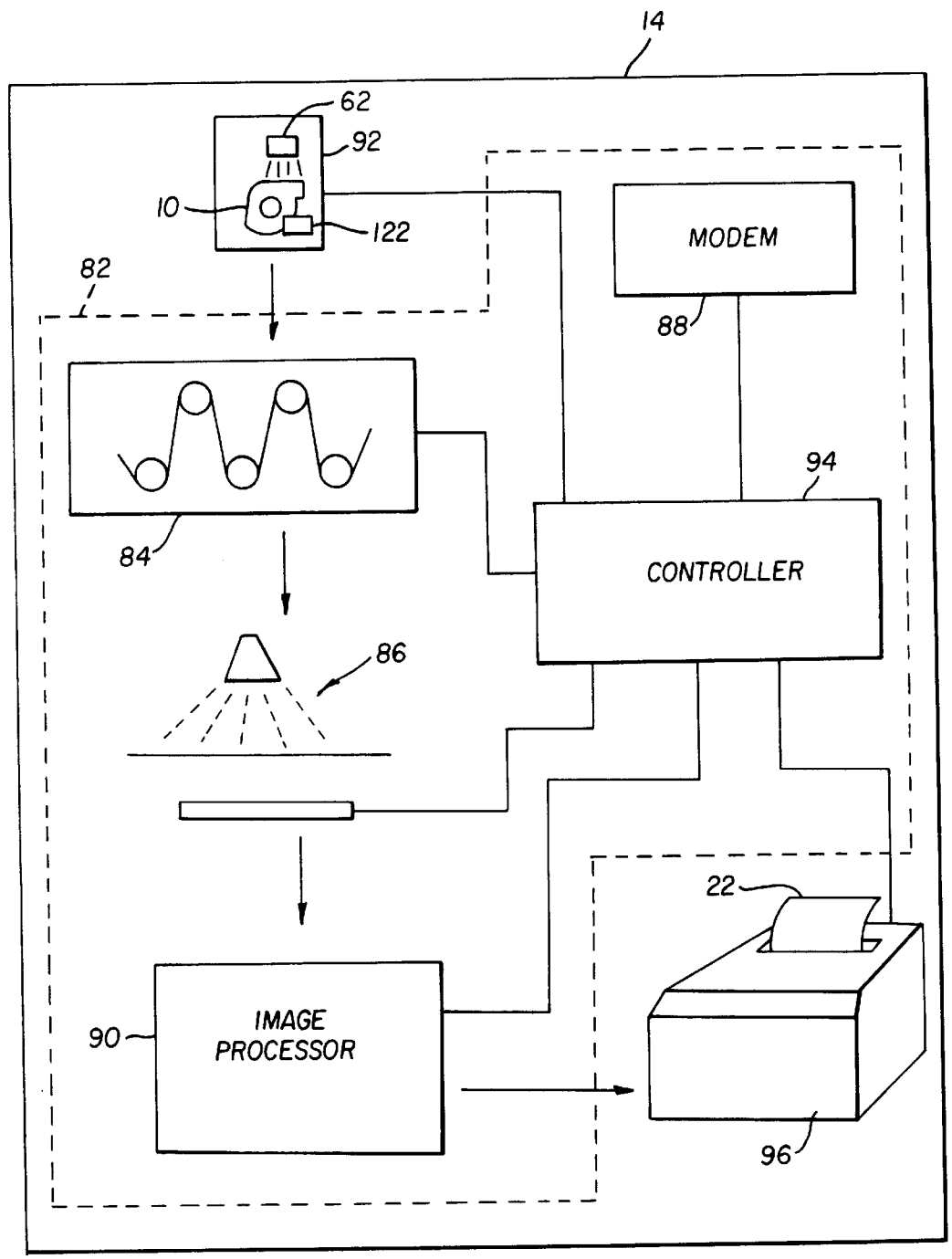
FIG. 5 is a diagrammatical view of an embodiment of the photofinishing unit of the system of FIG. 1.

Referring now particularly to FIG. 5, the photofinishing unit 14 has an entry station 92, a processor 82, and an output unit 96. The processor 82 includes: developing equipment 84, a digital input apparatus 86, a communicator 88, and an image processor 90. The various components are connected to the controller 94 by communication paths.

The entry station 92 is configured to receive individual film units 10 in sequence. A detector 62 or reader is disposed in the entry station 92 in a position to read the respective identifiers 42. The detector 62 outputs identifier 42 values to the controller 94. The controller 94 transmits the identifier 42 values to the look-up table 12 via a communicator 88 (illustrated as a modem). The communicator 88 receives the identifier values and interfaces with the look-up table 12 to transmit the identifier signals to the look-up table 12 and to poll the look-up table 12 for photofinishing parameters 52 corresponding to respective identifier 42. The appropriate photofinishing parameters 52 are then downloaded to the controller 94. Features of the entry station 92 and communicator 88 can be like those of the input device 16 previously described.

The controller 94 receives photofinishing parameters 52 from the look-up table 12 via the communicator 88. The controller 94 controls the developing equipment 84, digital input apparatus 86, image processor 90 and output unit 96 in accordance with the photofinishing parameters 52 to process the film unit 10. The terms "process" and "processing" and like terms used herein, refer broadly to the preparation of prints or other viewable images from film images or digital images, and are inclusive of printing, unless the context indicates otherwise.

The term "photofinishing parameters" used herein, refers to values for selectable aspects of processing. The "photofinishing parameter" is an element of data, such as a binary number; a list; a data structure; a record; or a software object, such as a unit of software, a text file, or an image. A photofinishing parameter can itself contain information or can be a pointer to a source of information available elsewhere; for example, in the same computer or through a network, such as the Internet. Specific parameters available and their values are dependent upon the capabilities of the equipment and software used for processing. The photofinishing parameters 52 control the operation of the processor 82, preferably by changing settings on automated equipment. Photofinishing parameters 52 can be used to signal requests for procedures requiring human intervention, but this is undesirable unless used for exceptional procedures, since it adds continuing costs and the risk of human error. The particular photofinishing parameters 52 customizable and available customizations are functions of the processing apparatus used. In the embodiment shown in FIG. 5, film is chemically processed in developing equipment 84, digitized by a digital input apparatus 86, modified by a digital image processor 90, and printed by a digital output unit 96, after modification. Each of components 84, 86, 90, 92, and 96 can provide customizable options. For example, the developing equipment 84 can process film according to a rated ASA/ISO or can optionally provide push or pull processing. The digital input apparatus 86 can scan at different resolutions. The digital output unit 96 can print on any of several different types of media varying in size or finish or weight.

The image processor can provide an almost unlimited variety of customizable options in addition to the digital image modifications applied to captured images as a part of ordinary processing, such as digital inversion of colors as a part of digital printing from color film negatives. These options can be roughly divided into two categories: remedial efforts and alterations. Remedial efforts are directed towards retaining the original information content, but improving the perceived quality of an image. Alterations deliberately modify some of the original information content of an image.

Figure 2A:
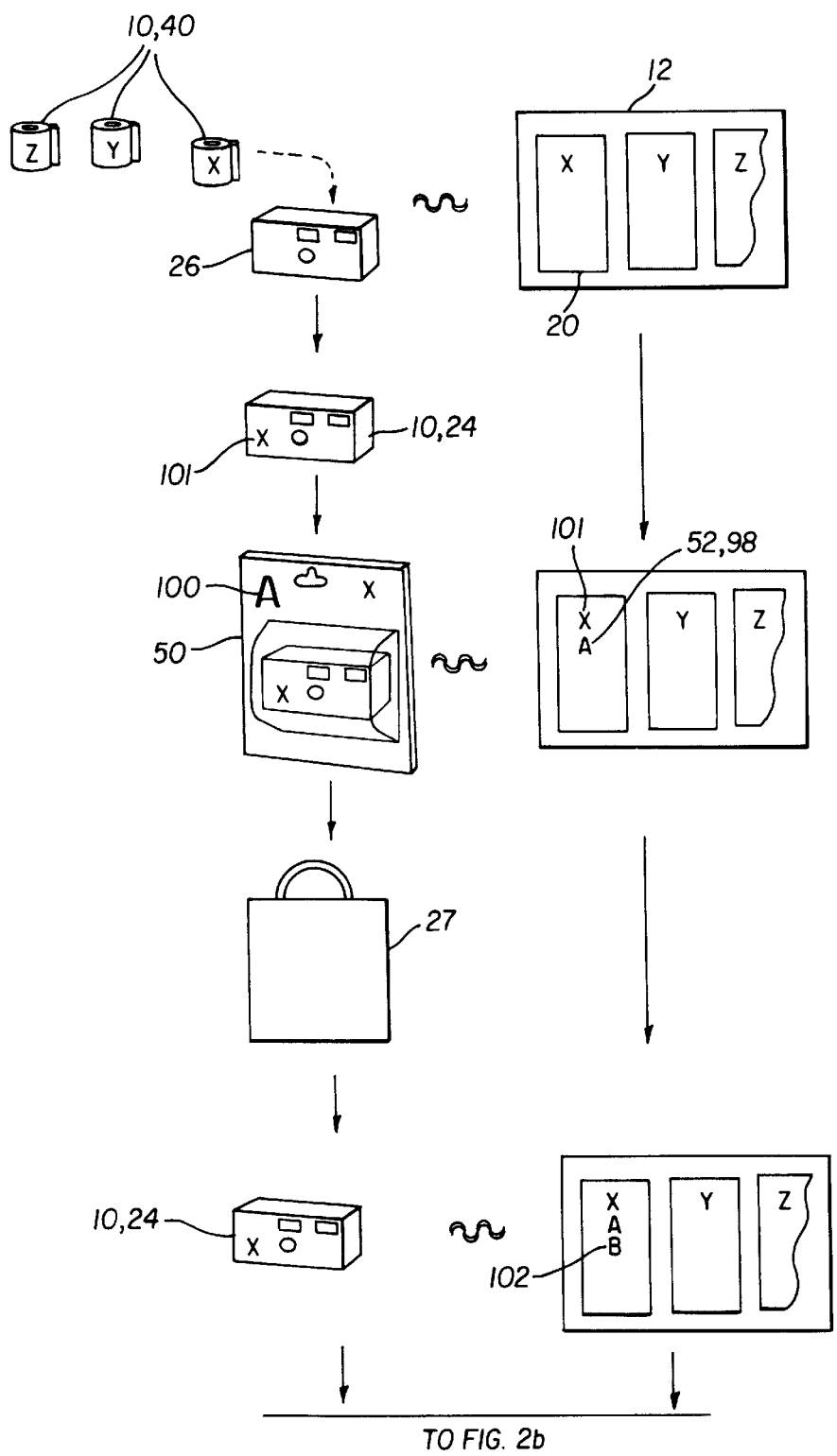
FIGS. 2a–2c are diagrammatical views of an embodiment of a method for handling photofinishing customization data.
Figure 2B:
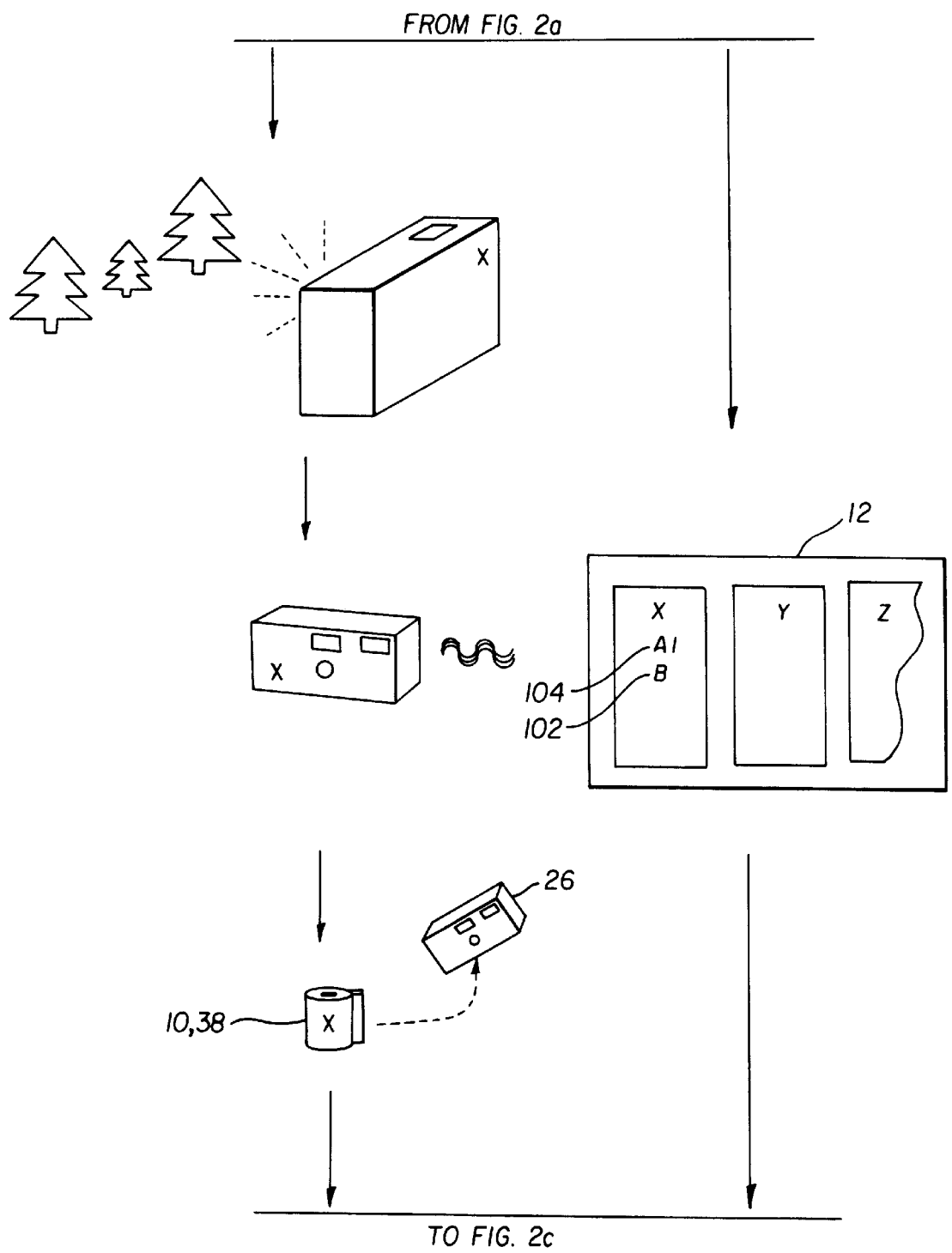
Figure 2C:
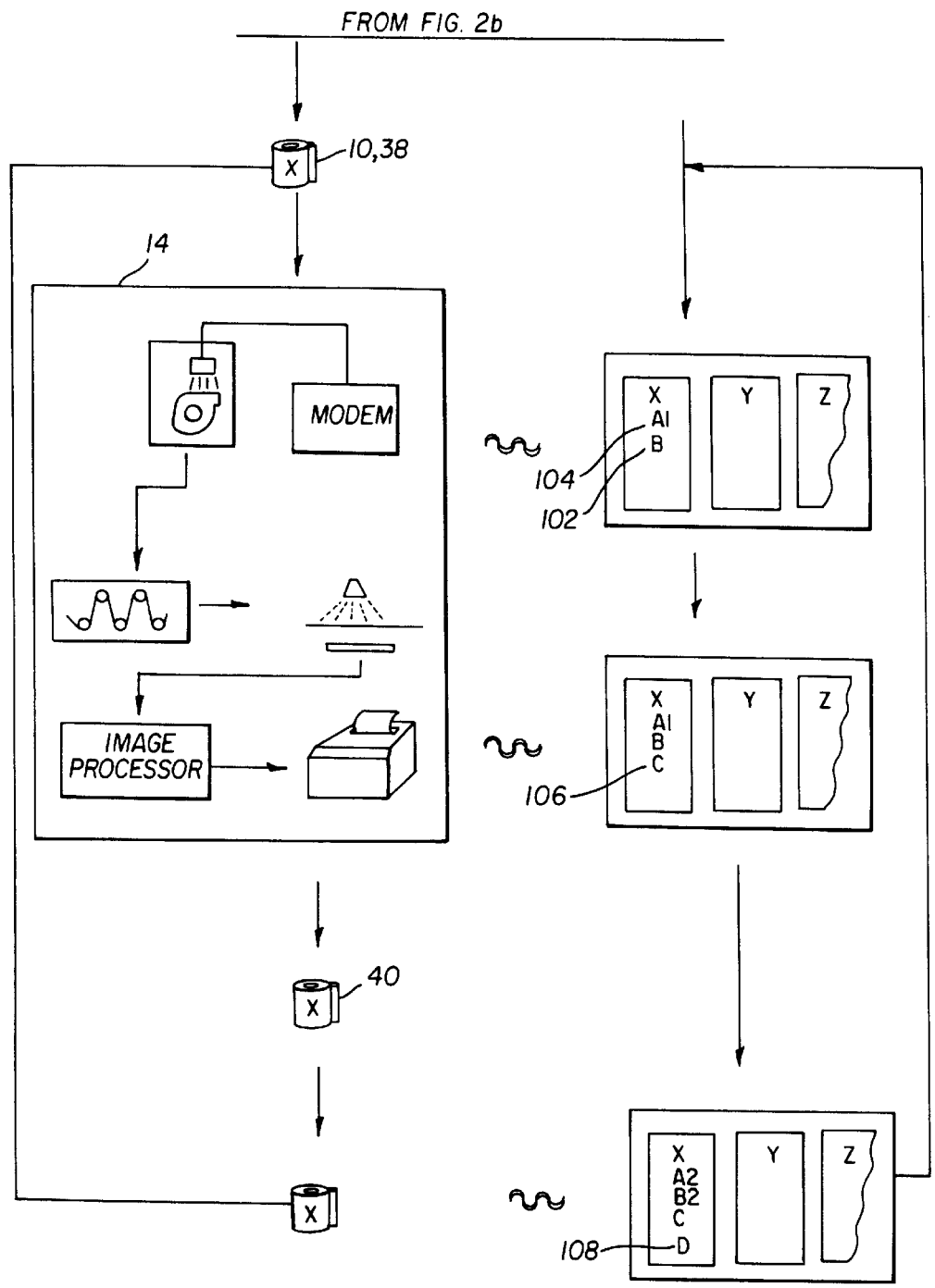

FIGS. 2a–2c illustrate a method for handling photofinishing customization data for a film unit 10 based on the system just discussed. A film unit 10 is provided and a logical memory unit 20 is allocated to the film unit 10. Film units 10 can be manufactured as a continuous part of the process or can be manufactured separately. In the embodiment shown in FIGS. 2a–2c, the film unit 10 begins as a film cassette 40 and is transformed into a one-time use camera 24 by assembly of the film cassette 40 into a one-time use camera body 26 (not separately illustrated).

The logical memory unit 20 for a particular film unit 10 can be allocated to the film unit 10 at any stage in the manufacture of the film unit 10. The allocation can be limited to setting aside a range of memory, but preferably also includes setting up individual logical memory units 20 for each film unit 10 and associating identifiers 42 with respective film units 10 by either recording identifiers 42 in respective logical memory units 20 or structuring the table to indicate the association between identifiers 42 and their logical memory units 20. The logical memory unit 20 for a particular film unit 10 can also be allocated to the film unit 10 after manufacture, by the producer, or by a distributor or other reseller (hereafter referred to collectively as "dealer"). The logical memory unit 20 for a particular film unit 10 can even be allocated to the film unit 10 after vending (symbolized in FIG. 2a as a shopping bag 27) to the user. The term "vending" is used herein to cover sale, trade, gift, exchange, or any other transfer of ownership and/or control of the film unit 10 from one person or organization to another.

Film unit customization, that is, the writing of changes in photofinishing parameters 52 to the look-up table 12, can occur in the hands of one or more of the producer, the dealer, and the user. Like "dealer", "user" is used herein as a collective term. Film units 10, particularly one-time use cameras 24 are commonly given as gifts, passed hand to hand for picture taking and otherwise used by more than one person. Absent limitations discussed below, the film unit 10 can be customized at any point by the holder of the film unit 10.

The film unit 10 can be customized as a part of the assembly process by the producer. This can be convenient where a large number of identically customized film units 10 are required. For example, a large number of identically customized film units 10 can be provided for a particular distributor or major sporting event. The film unit 10 can be customized during distribution by a dealer. This can be convenient for customization of moderate or small numbers of film units 10. For example, a batch of identically, or non-identically, customized film units 10 can be provided for a particular event such as a wedding. The film unit 10 can also be customized after transfer to a final user. This is practical for customizing a single one-time use camera 24 or small number of cameras. As a further convenience, the camera 24 can be customized before, during, and after use; and when the film unit 10 is returned as a container of processed film, the film unit 10 can be further customized for reprints or other final images.

Customization is generally discussed herein in terms of one film unit 10 and its associated logical memory unit 20, but it will be understood that multiple film units 10 can be customized at one time, if desired. For example, an input device 16 can repeat parameter modifications for all the film units 10 in a submitted list. Multiple film units 10 can be customized at the same time in different ways to provide a group of film units 10 having different features. For example, a wedding group could combine color and black-and-white cameras. Customization can also be performed in stages. For example, a producer can supply a distributor or user with a camera or cameras possibly having some customizations along with instructions or appropriate software suggesting further customizations. This approach may be desirable if the set of available photofinishing parameters 52 is very large and likely to prove burdensome to an inexperienced person.

The set of possible customizations will change over time and improvements or alterations in possible photofinishing parameters will be made. The system accommodates this kind of changes, since a user can change parameters when additional photofinishing is requested.

When a film unit 10 is customized, the identifier 42 is communicated to the look-up table 12 along with a desired change in at least one of the photofinishing parameters 52 for the film unit 10. The look-up table 12 receives the information and writes changes to the logical memory unit 20 associated with the identifier 42 and film unit 10. In FIGS. 2a–2c, a film unit 10 in the form of a film cassette 40 is assembled into a one-time use camera 24 body and a logical memory unit 20 is associated with the film unit 10. A copy of the identifier 42 is printed on the exterior of the completed one-time use camera 24. The one-time use camera 24 is packaged. A copy of the identifier 42 can be printed on the packaging 50, if needed, to allow customization of the film unit 10 without removal of packaging 50.

The film unit 10 is first customized at this time. This is illustrated in FIGS. 2a–2c as the addition of the photofinishing parameter "A" 98 to the logical memory unit 20 for the film unit 10. The packaging 50 bears an indicia 100, illustrated by a large letter "A", which communicates the customization to a purchaser. If desired, customization information can be written to packaging 50, a film unit exterior, or an addendum during any customization. The film unit 10 is then sold and customized by the user. This is illustrated in FIGS. 2a–2c as the addition of the photofinishing parameter "B" 102 to the logical memory unit 20 for the film unit 10. A series of images are captured and the film unit 10 is again customized. This is illustrated in FIGS. 2a–2c as a change of the photofinishing parameter "A" 98 to photofinishing parameter "A1" 104. The film unit 10 is tendered for photofinishing and the one-time use camera body 26 is removed. The photofinishing unit 14 reads the identifier 42 on the film unit 10 and communicates with the look-up table 12 to determine the photofinishing parameters 52 for the film unit 10. The look-up table 12 reports (retrieves) the photofinishing parameters 52 and the film is processed in accordance with those parameters. The photofinishing unit 14 also customizes the film unit 10. This is illustrated in FIGS. 2a–2c as the addition of the photofinishing parameter "C" 106 to the logical memory unit 20 for the film unit 10. The film unit 10 is returned to the user, along with final images (not separately illustrated). The film unit 10 is again customized and is returned for additional photofinishing. This is illustrated in FIGS. 2a–2c as an addition of the photofinishing parameter "D" 108 and changes in the photofinishing parameter "A1" 104 to photofinishing parameter "A2" 110 and photofinishing parameter "B" 102 to photofinishing parameter "B2" 112.

The parameters 52 can be related to particular procedures to provide a detailed example. Referring to FIGS. 2a–2c, the first customization is by the producer and photofinishing parameter "A" 98 can designate borderless photographic prints in pseudo-panoramic format (hereafter "pan" prints. The next customization is by the user and photofinishing parameter "B" 102 designates that the user wants the photofinishing product 22 returned by mail and supplies a mailing address or the like. The next customization is also by the user and indicates pan prints with a particular border. The next customization is by the photofinisher. The photofinishing parameter "C" 106 is added to indicate that the film unit 10 has been developed and any future processing would exclude film development. The next customization is again by the user. The photofinishing parameter "A2" 110 indicates pan prints with a different border. The photofinishing parameter "B2 is a new return address for the user. The photofinishing parameter "D" 108 lists the negative from which additional prints are requested. It will be apparent from this example, that the photofinishing parameters 52 can relate to any photofinishing services for a particular film unit 10. Other services or products unrelated to photofinishing of that film unit 10 could also be provided, but this would likely be of limited utility unless the services or products had some relationship to the images captured in the film unit 10.

Figure 17:
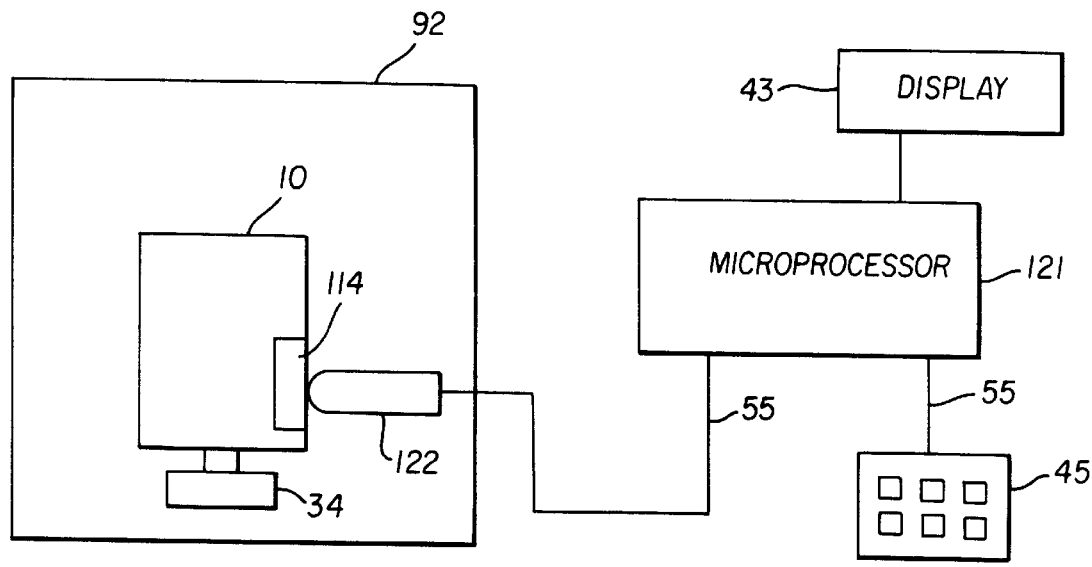
FIG. 17 is a diagrammatical view of an embodiment of the film unit including local data memory and components necessary to utilize the memory.
Figure 18:
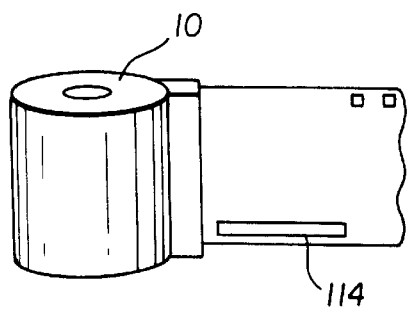
FIGS. 18–19 are semi-diagramnmatical views of embodiments of the film unit that include a local data memory.
Figure 19:
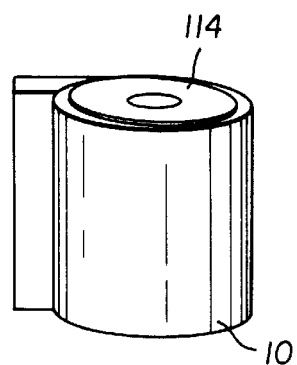
Figure 20A:
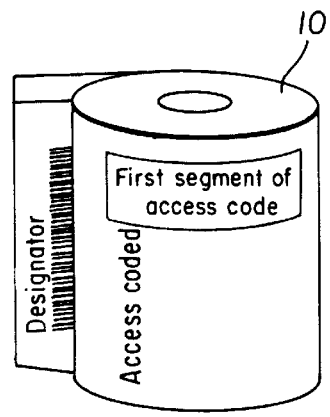
FIG. 20 is a diagrammatical view of a system including an access coded film unit.
Figure 20B:
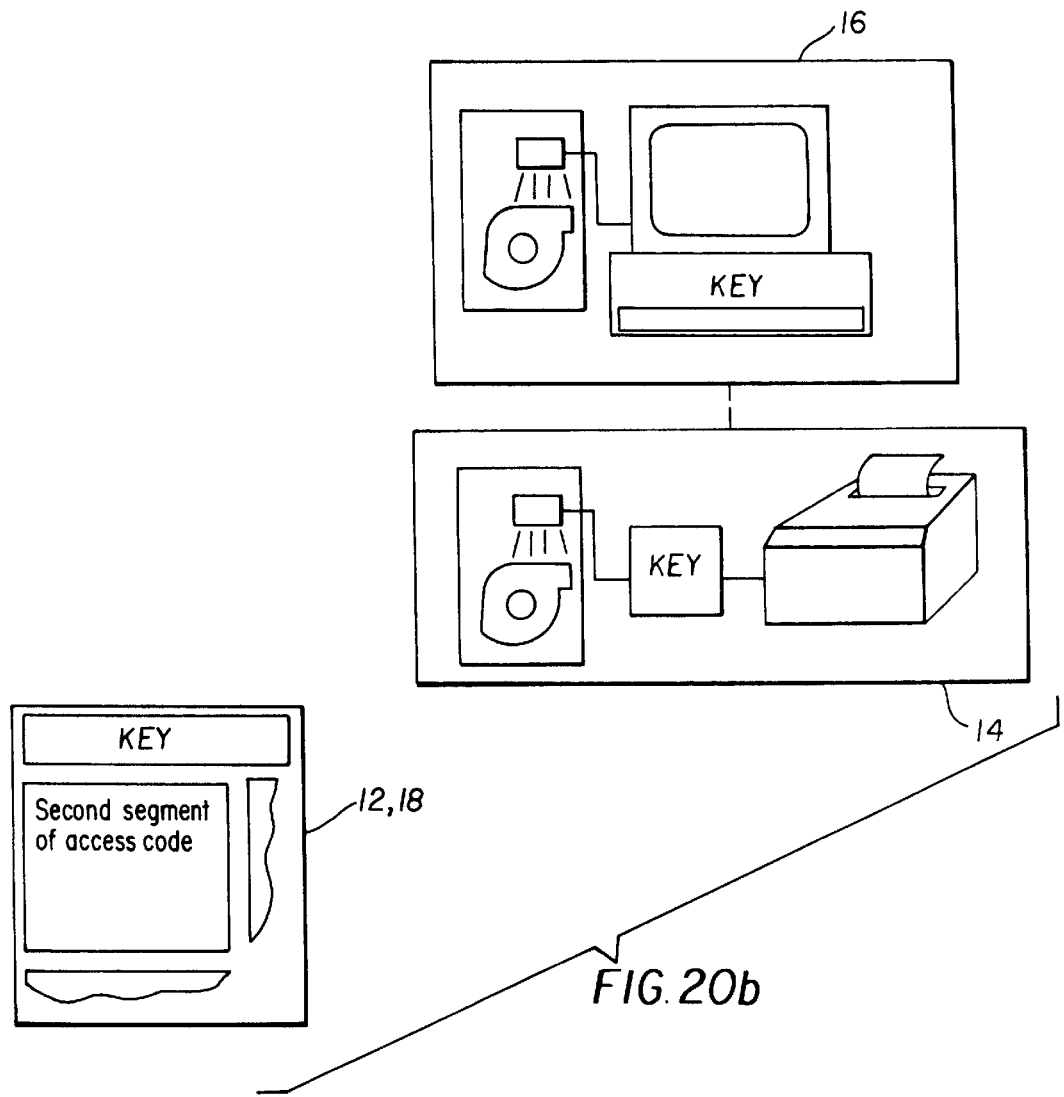

Customization, as the term is used herein, is limited to exposure-independent information, that is information that is independent of variable camera and/or scene factors at the time of image capture. Those factors, which are referred to herein as capture device recorded information, are commonly captured at the time of image exposure. For example, some Advanced Photo System™ cameras record shutter speed, flash usage, and camera-to-subject distance for each exposure. Referring now to FIG. 19, the film unit 10 can include a local data memory 114 for storage of capture device recorded information. The form of the local data memory 114 is not critical. For example, the local data memory 114 can be a magnetically recordable layer on photographic filmstrip 36 or can be an electronic memory component installed in a film cassette 40 or the body of a one-time use camera 24. FIG. 17 illustrates a film unit 10 and components necessary to utilize the local data memory 114. In this case, the local data memory 114 is an electronic memory unit or magnetically recordable region included within or on the film cassette. Components necessary to utilize the local data memory 114, such as a controller 121 and a read-write device 122, can be supplied in the film unit 10 or can be supplied by the input device 16 or the camera or other device.

As in the Advanced Photo System™, the local data memory 114 can also be used to carry photofinishing parameters that provide exposure-independent information such as the user's name and the user's title for the whole filmstrip. The camera writes the photofinishing parameters to the local data memory 114 either automatically or at the user's option.

Figure 8A:
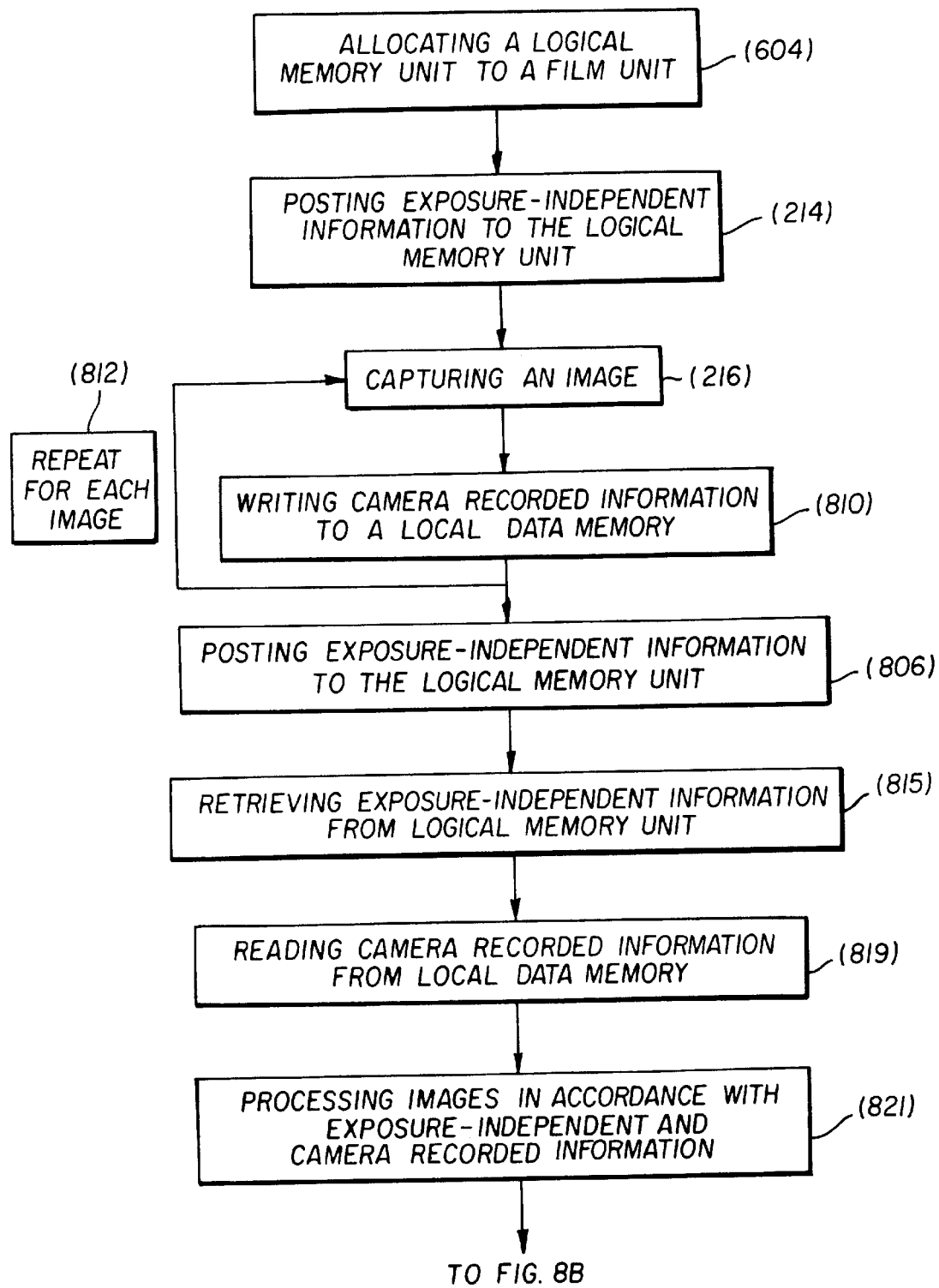
FIG. 8 is a diagram of an embodiment including methods for storing capture device recorded and exposure independent information related to a film unit and archiving the logical memory unit.

FIG. 8a illustrates an embodiment of the method for storing capture device recorded and exposure independent information related to a film unit. A logical memory unit 20 is allocated (604) to the film unit 10. Photofinishing parameters providing exposure-independent information are written (214) to the logical memory unit 20 as previously described, before or after (806) image capture (216) or both. Photofinishing parameters providing capture device recorded information are written (810) to the local data memory 114 for each image capture (812) or otherwise. The capture device recorded information is read (819) during photofinishing by appropriate equipment and the exposure-independent information and any other photofinishing parameters in the logical memory unit are retrieved (815). The film unit is then processed (821) in accordance with the capture device recorded information, and exposure-independent information and any other photofinishing parameters in the logical memory unit. Conflicts between the two sources of information are likely to be uncommon and can be handled by predetermined priority rules. It is preferred that the identifier 42 for the film unit 10 be recorded in the local data memory 114 to help ensure that information is handled appropriately when the local data memory 114 is read during photofinishing.

Figure 8B:
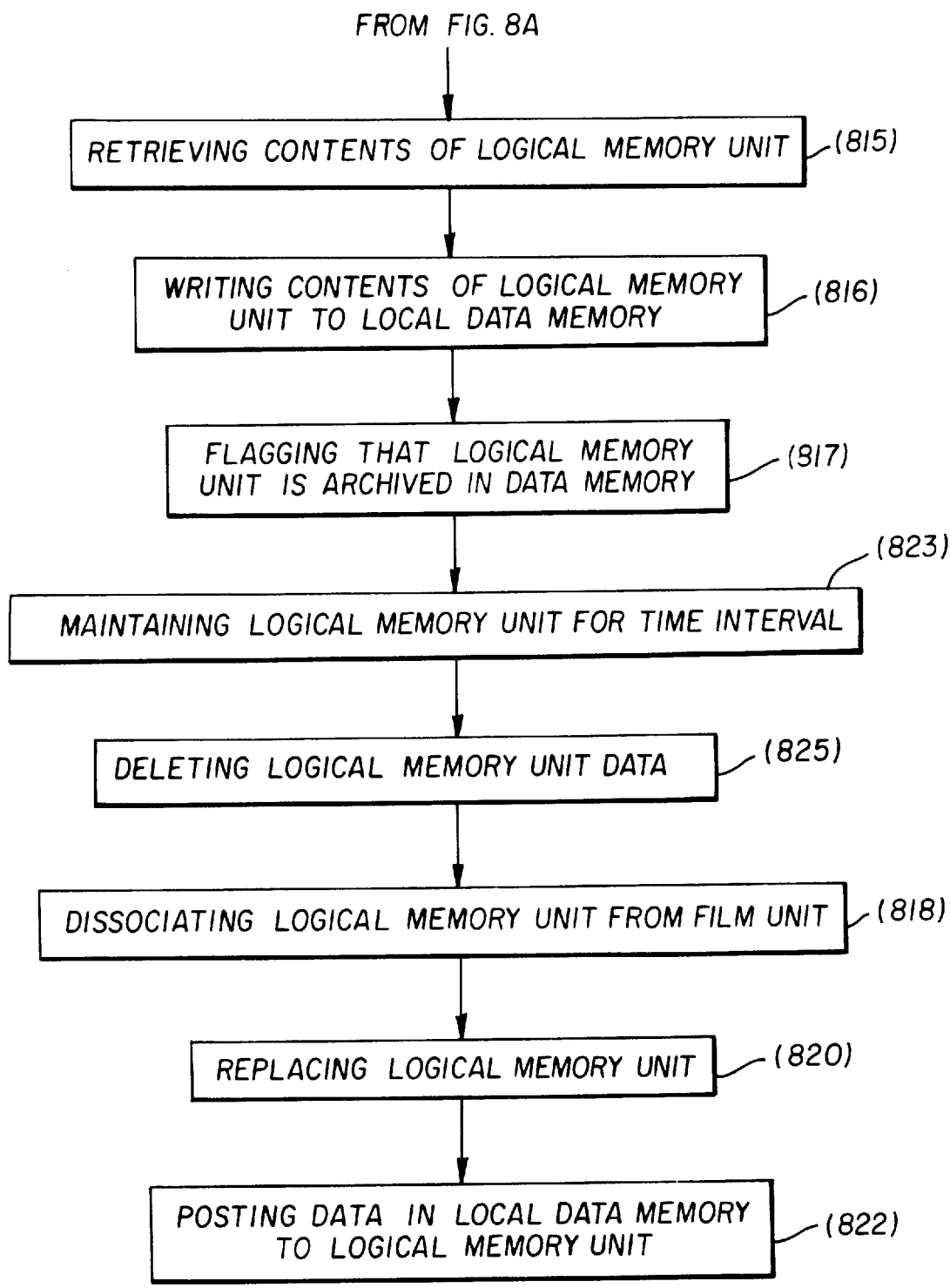
Figure 21A:
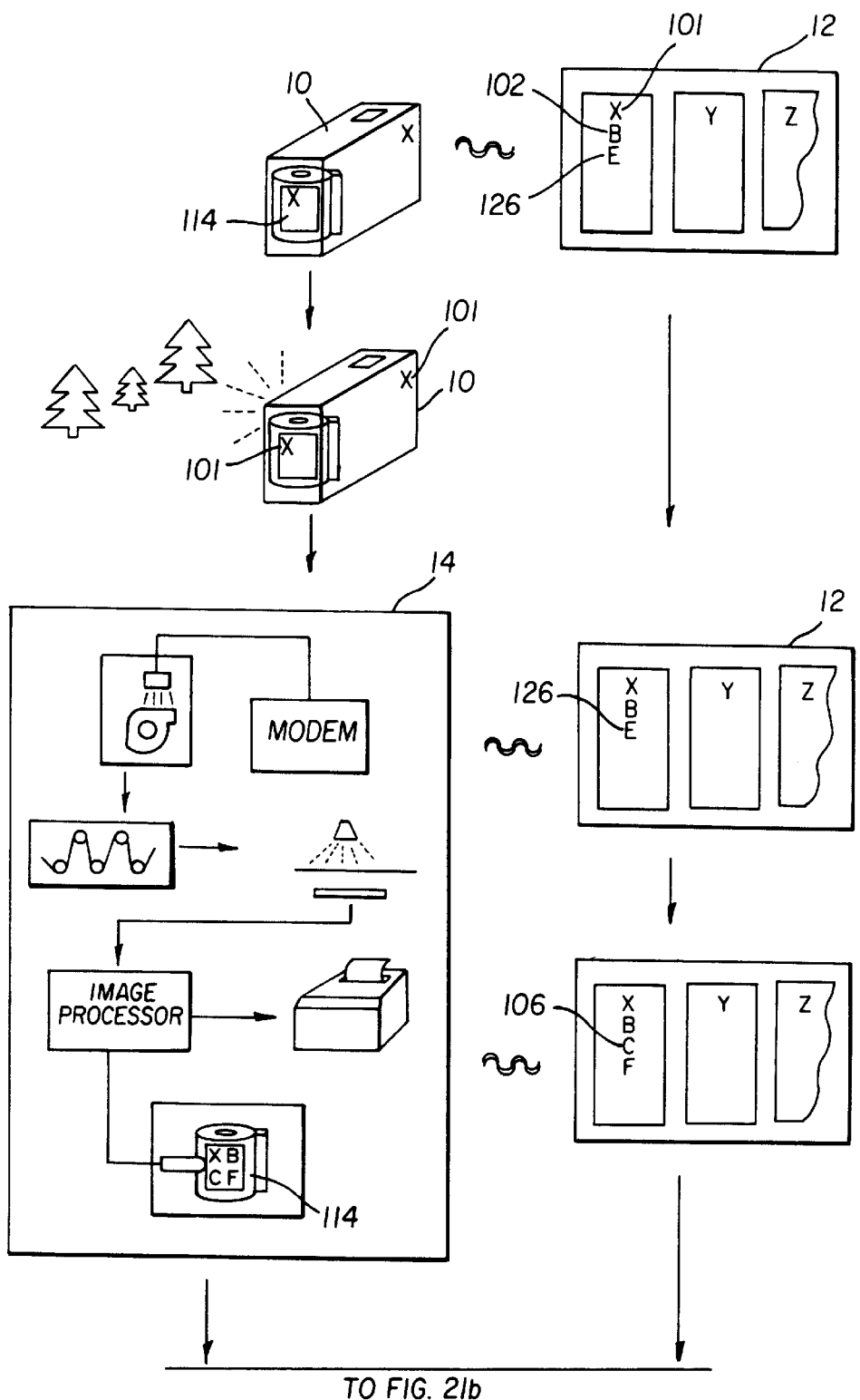
FIGS. 21a–21b are diagrammatical views of an embodiment of the method for archiving a film unit.
Figure 21B:
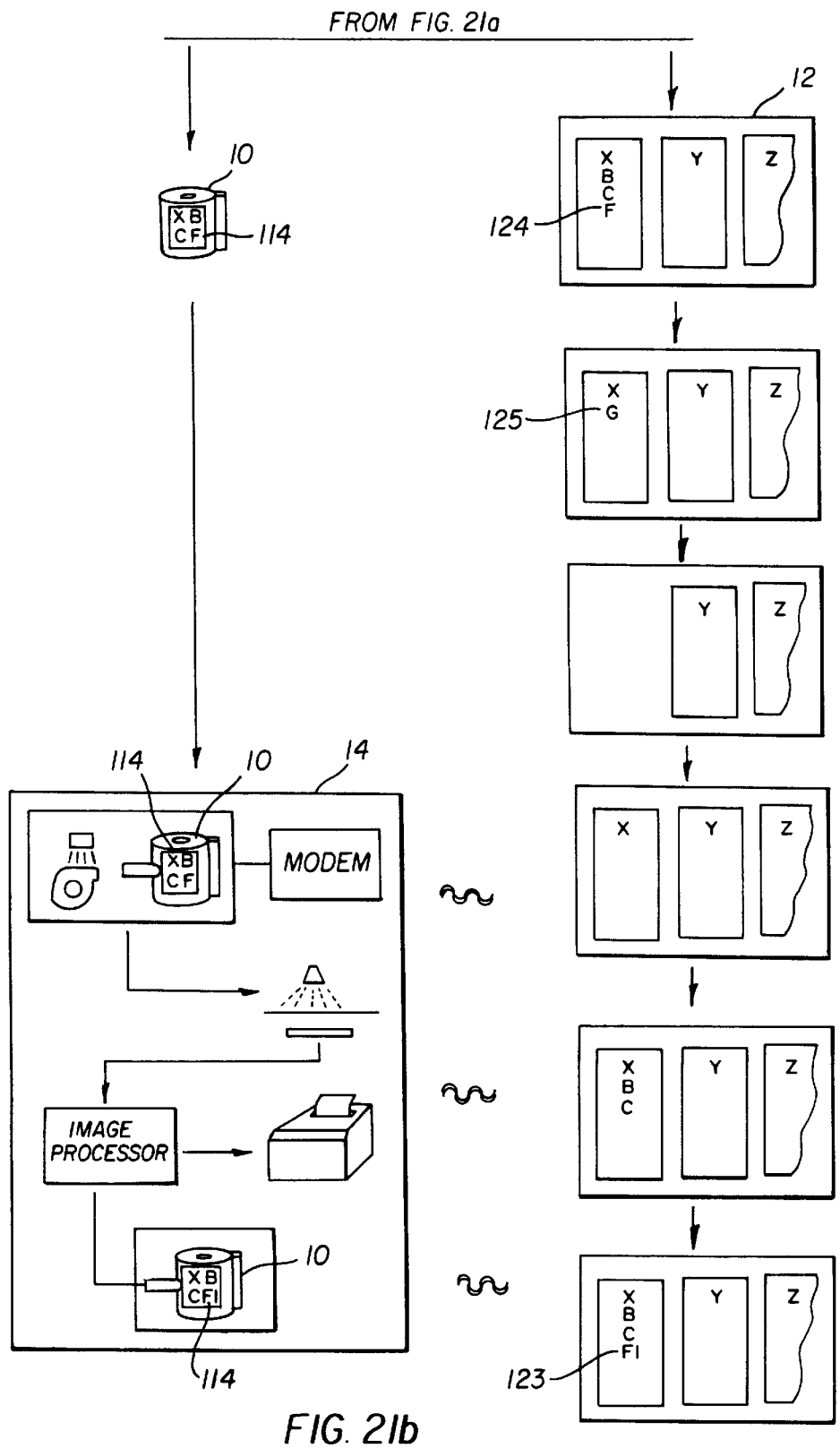

Referring to FIGS. 8b and 21a–21b, at the time of processing, the exposure-independent information can be retrieved (314) from the logical memory unit (unless already retrieved) and can be recorded (816) in the local data memory 114. In FIG. 21a, the identifier "X" (reference numeral 101) appears in the local data memory and logical memory unit along with prerecorded photofinishing parameters "B" (reference numeral 102) and "E" (reference numeral 126). Images are captured and the film unit is initially photofinished. Parameters not useful in future photofinishing are deleted from the logical memory unit. In FIG. 21, "E" is deleted and "C" is posted, which is a parameter that indicates the film has been processed. If desired, the exposure-independent information can also be read and recorded (816) to the local data memory when the film unit is placed in an input device and the logical memory unit is accessed. The recording in the local data memory provides a back-up for the logical memory unit 20. The logical memory unit can be flagged (817), indicated by the letter "F" (reference numeral 124) in FIG. 21, to indicate that the exposure information has been archived to the local data memory. The logical memory can be maintained (823) for some predetermined time period. The "flag" can indicate a maintenance period. The photofinishing parameters recorded in the local data memory can then be removed (825) from the logical memory unit in the look-up table 12 or the logical memory unit for the film unit can be dissociated from the film unit, that is, deleted (818), or both can be done in sequence. If the logical memory unit is retained, the included information can be limited to the posted identifier and a flag, "G" (reference numeral 125) in FIG. 21, that indicates that photofinishing parameters have been archived and deleted, or simply deleted. The photofinishing unit can use the flag "G" to actuate reading of the local memory unit of the respective film unit. This can save considerable space in the look-up table. If the film unit is submitted for further photofinishing later, a new logical memory unit can be allocated to replace (820) the deleted one and the parameters in the local data memory can be posted (822) to the replacement logical memory unit. In FIG. 21, the flag "F1" (reference numeral 123) with a new maintenance period replaces the earlier flag "F".

Customization of a film unit 10 using exposure-independent information requires, at a minimum, that the logical memory unit 20 for a particular film unit 10 must be maintained until photofinishing parameters 52 are reported to an appropriate photofinishing unit 14. It is preferred that the logical memory unit 20 remain accessible for repeated customizing before and after an initial photofinishing and accessible for repeated reports to photofinishing units 14. The simplest solution is for the look-up table 12 to keep all the parameters in all logical memory units 20 indefinitely. The storage space required would be manageable, since although the number of film units 10 would be very large, the total information stored per unit would be small or could be made small by deleting some information. Logical memory units 20 can also be maintained for a predetermined time period, such as five years from date of sale or five years from the last photofinishing event. Since the identifier remains unique, a logical memory unit 20 that has been deleted can be reallocated automatically when the film unit 10 is placed in an input device 16 or photofinishing unit and the look-up table is accessed. Photofinishing parameters 52 can be recreated at that time or can be restored from values in a local data memory 114.

Figure 7:
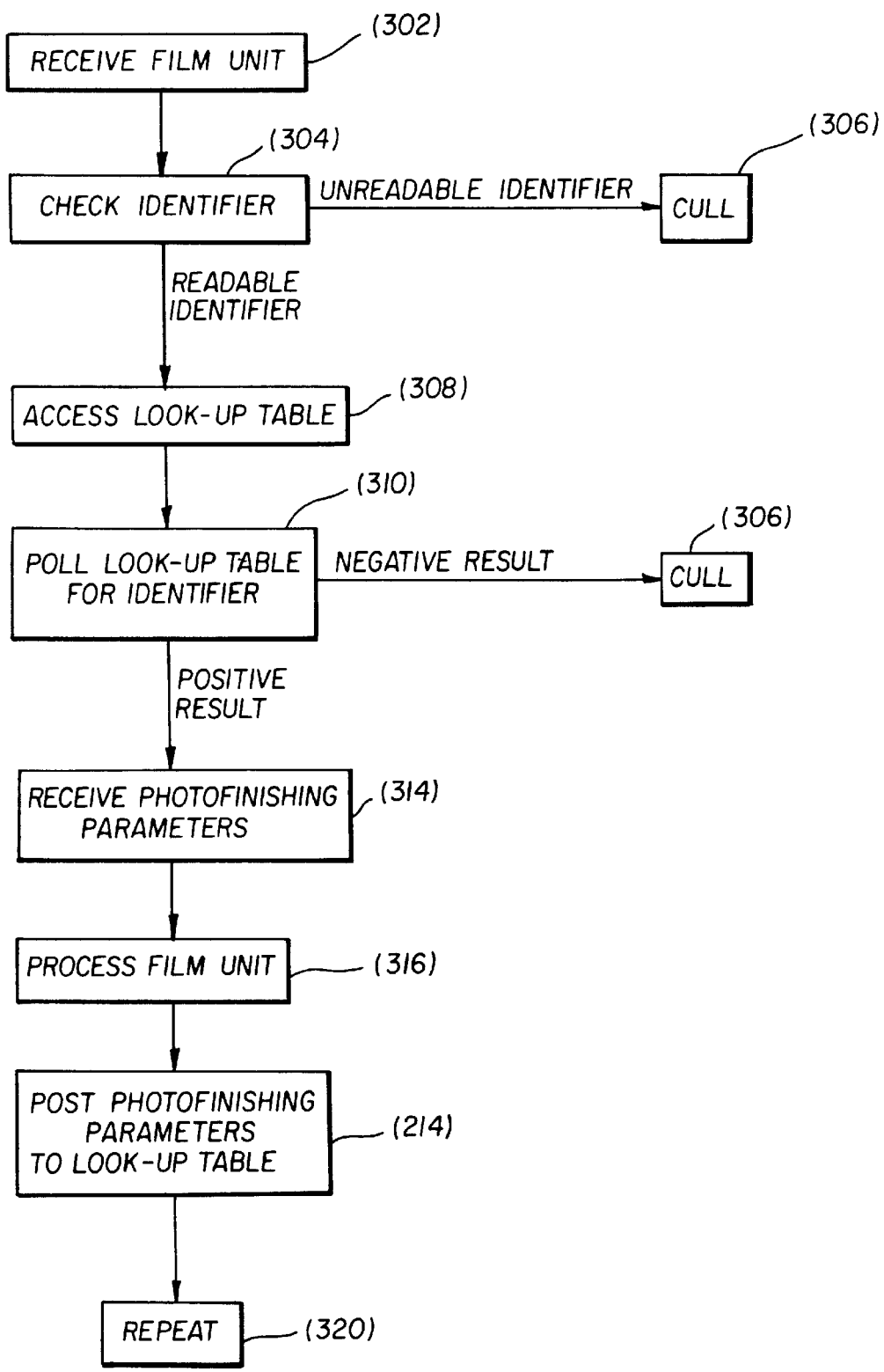
FIG. 7 is a diagram of the photofinishing method.

In addition to maintenance of the logical memory unit 20, customization also requires that the photofinishing unit 14 access the logical memory unit 20 and perform photofinishing in accordance with the recorded photofinishing parameters 52. Referring now to FIGS. 5 and 7, a sequence of film units 10 are fed into the entry station 92 of the photofinishing unit 14 by automated material handling equipment or manually. The entry station 92 receives (302) one film unit 10 at a time. (Multiple entry stations 92 can be utilized in tandem, if desired.)

The film units 10 can be sorted by identifier 42 or prearranged in some other manner, but ordinarily, the film units 10 are a mixture in random order by identifier 42. The mixture of film units 10 can include film units 10 in which an identifier 42 is damaged or missing. The mixture can include film units 10 in which the identifier 42 is unreadable or spurious due to error, or damage, or deliberate counterfeiting. The mixture can further include film units 10 in different states. For example, some of the film units 10 can include undeveloped film having captured, latent images; while others of the film units 10 can include previously developed film having captured, developed images, returned for further photofinishing. The mixture can also include undeveloped film units 10 requiring different development processes.

Once in the entry station 92, the film units 10 are checked (304) for the presence of a readable identifier 42. The reader is directed at the film units 10 and the identifier 42 is read, or found unreadable. It is highly preferred that this step is automated, thus it is also preferred that the film units 10 are standardized in shape and position of identifier 42 to ensure easy and accurate reading of identifiers 42. If the identifier 42 of a particular film unit 10 is found to be unreadable, then that film unit 10 is culled (306). The culled film unit 10 is then subject to special handling. For example, the film unit 10 can be processed individually or returned to the submitter or a new identifier 42 can be placed on the film unit 10 and the film unit 10 can then be resubmitted to the entry station 92. An identifier 42 is unreadable if no identifier 42 information can be obtained or if the information is noticeably incorrect in some way. For example, an identifier 42 can include a checksum or other error checking code, which would render an identifier 42 unreadable, if incorrect.

After reading the identifier 42, the photofinishing unit 14 accesses (308) the look-up table 12 and polls (310) the look-up table 12 to determine if the identifier 42 is listed. If the identifier 42 is unlisted or otherwise unidentified, the film unit 10 is culled (306) and handled separately as previously described. The photofinishing unit 14 receives (314) from the look-up table 12 a report of photofinishing parameters 52 for each film unit 10 having a listed identifier 42 and processes (316) the film unit 10 in accordance with the respective photofinishing parameters 52. The photofinishing parameters can then be changed (214) in the look-up table to indicate that the film was processed and, if desired, record other information about the processing. The process can be repeated (320) for additional photofinishing of the same film unit.

Photofinishing parameters 52 can be obtained from the look-up table 12 as needed immediately before processing of a film unit 10 or can be earlier obtained and then stored within the controller 94 of the photofinishing unit 14 until needed.

Processing will vary depending upon the photofinishing parameters 52. For digital film units or previously developed film type film units 10, the photofinishing parameters 52 will indicate that current photofinishing is exclusive of film development. When a film unit 10 is first developed a change can be written to the photofinishing parameters 52 in the respective logical memory unit 20 of the look-up table 12 to indicate that the film was developed. Other changes can be written to record characteristics of the processing, as desired. For undeveloped film units 10, the photofinishing parameters 52 can include parameters that control sorting equipment to sort the film units 10 to different processes and set up parameters for automated developing equipment 84 providing those processes. Photofinishing parameters 52 for printing can include digital alteration of images, selecting of media for hard copy or digital copies, selection of particular promotions, and the like. Table 1 lists some examples of categories of photofinishing parameters 52.

TABLE 1

Optical distortion correction
Lateral color optical defect correction
Edge sharpening
Contrast correction
Color saturation correction
Improve grain, contrast, and color in underexposed pictures
Film latitude improvement
Grain reduction
Improve color accuracy
Zooming and cropping
Intentional distortion
Solid color fill as in comic book pictures
Soft focus effects
Contrast exaggeration or reduction
Monochrome (black-and-white, sepia)
Redeye removal
Texture effects
Print only outlines, like a coloring book
Add predetermined titles or logos to front or back
Solarization effects
Special borders or other photomontage
Add Copyright message
Sticker prints
Poster prints
Double prints TABLE 1-continued Selected paper surface finish
Selected digital medium
Stock photo or promotional item with order
Delivery by mail including delivery address
Billing information
User information included on prints
Internet services
Internet or other network paths to particular services The photofinishing parameters 52 can be recorded in the table as detailed instructions to control automated photofinishing equipment, or the like, or can be recorded as pointers to databases containing those instructions. The databases can be remote from the equipment or can be incorporated within individual devices or groups of photofinishing units 14. In a preferred embodiment, the identifiers 42 are numbers that form a consecutive continuous series. A look-up table 12 is allocated such that each logical memory unit 20 of that look-up table 12 corresponds to one and only one member of the series of identifiers 42. The look-up table 12 contains only pointers to other data records. Initially, the pointers are all set to some value that indicates "no data". When photofinishing data is added to the logical memory unit 20 corresponding to the physical film unit 10, a pointer to a record containing relevant data replaces the "no data" pointer. If film characteristics are pointed to when the film unit 10 is manufactured, a subsequent valid request for data for a film unit 10 should never result in a "no data" message.

The look-up table 12 contains important information that should not be subject to a risk of easy accidental or malicious damage. A measure of security can be provided by use of an access code 128 that must be submitted for access to the logical memory unit 20 for the film unit 10 having that serial number. The access code 128 can be a part of the identifier 42 or can be supplemental to the identifier 42. (Access codes 128 in the form of encrypted cognates of a human readable label number are discussed below.) The access code 128 is recorded in the respective logical memory unit 20 or is instead recorded in a gatekeeper 130, a physical or logical part of the look-up table 12, which limits access to the logical memory units 20. For access to be granted to a particular logical memory unit 20, both the identifier 42 and the access code 128 must be submitted and matched. The use of the access code 128 protects against misuse of the look-up table 12. Incorrect access codes 128 submitted with correct identifiers 42 likewise block access. To be useful, the access code 128 needs to be somewhat individual to a particular film unit 10 and available to the holder of the camera when customization is desired.

Figure 9:
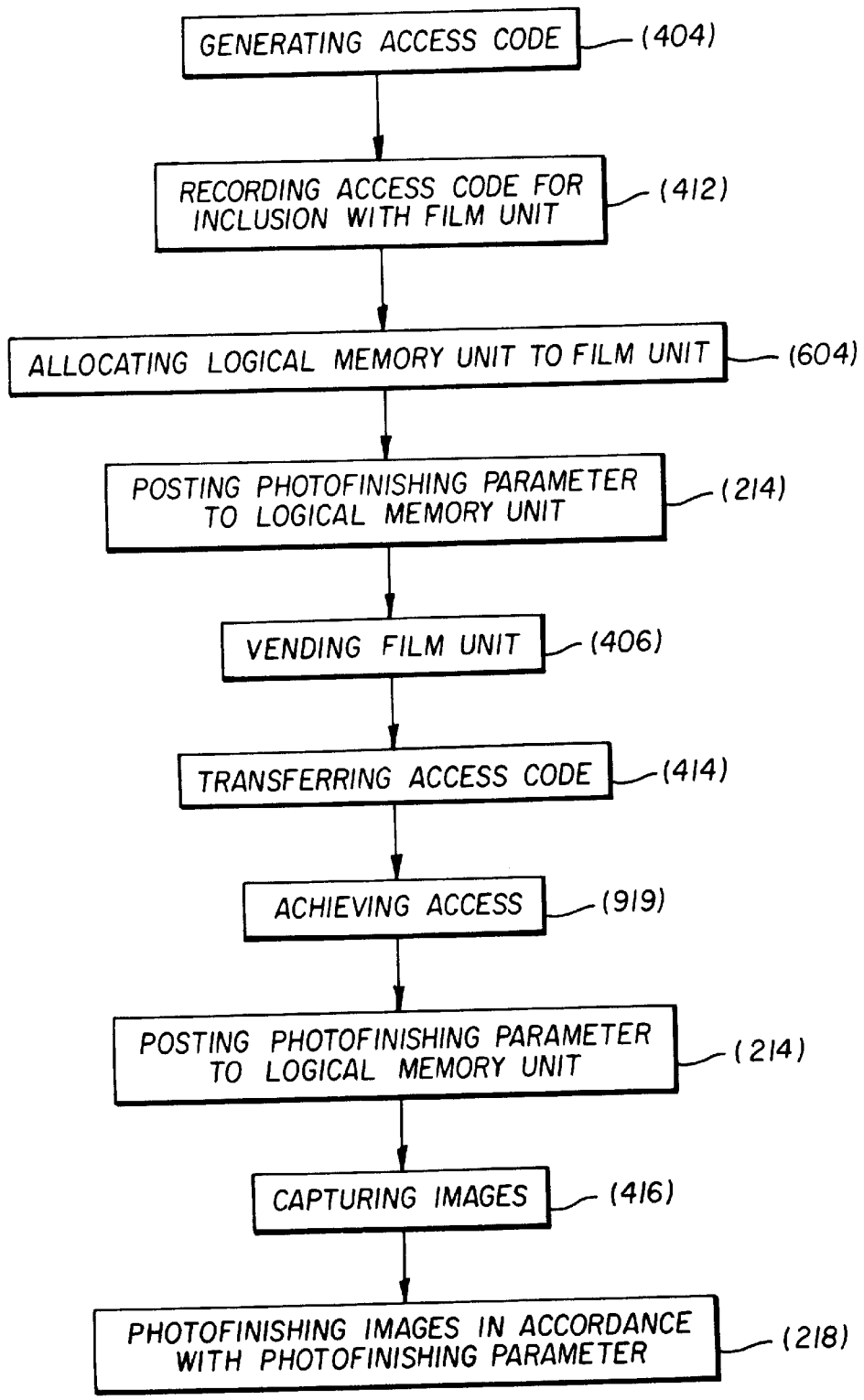
FIG. 9 is a diagram of the method for secure customization of a film unit.
Figure 10:
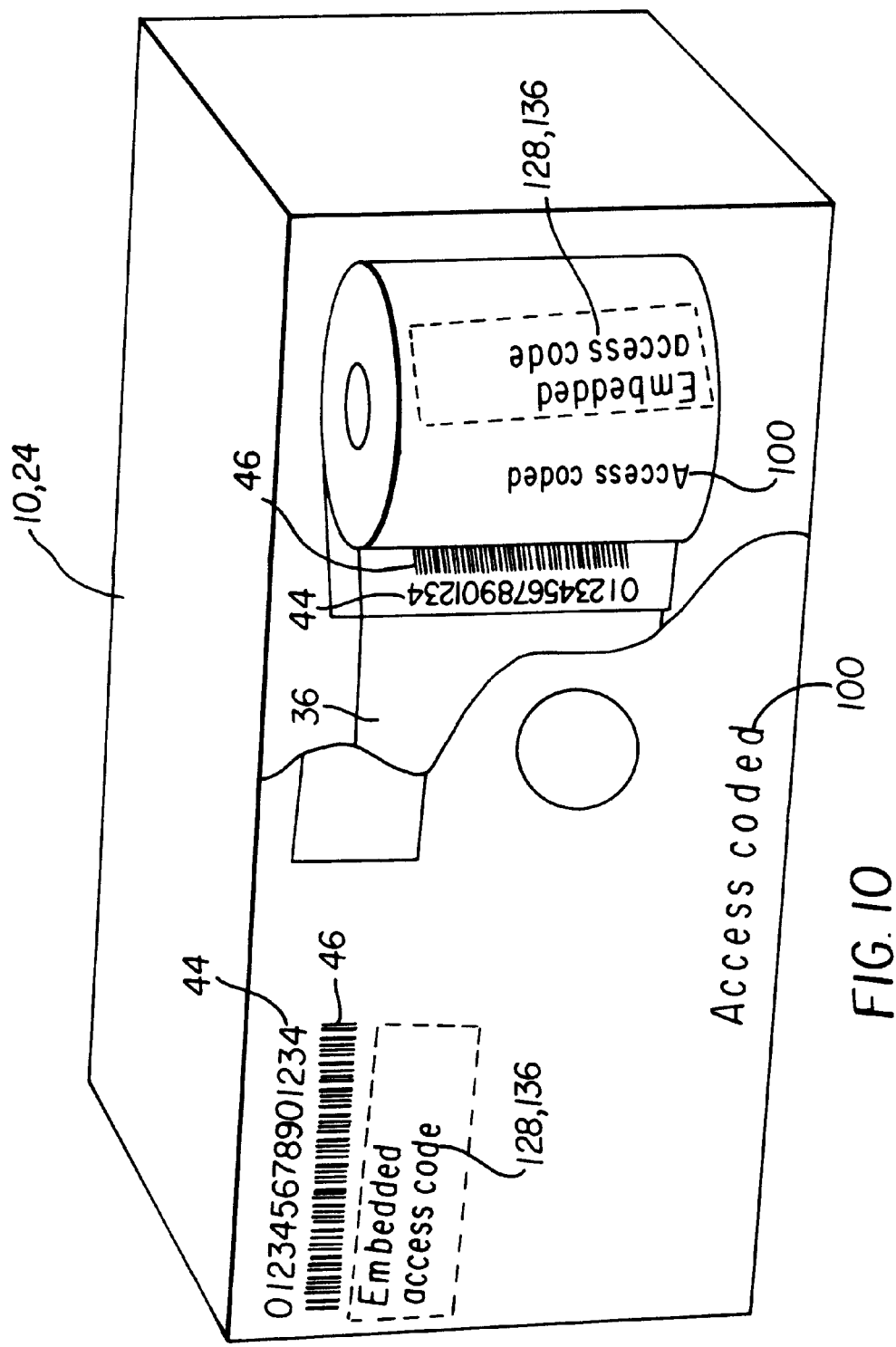
FIG. 10 is a cut-away, semi-diagrammatical perspective view of a film unit having an access code and identifier on both a one-time use camera body and on an included film cassette.

Referring now particularly to FIGS. 9 and 10, the access code 128 for a particular logical memory unit 20 is transferred along with the respective film unit 10. The logical memory unit 20 has an access right that is secured by the access code 128. The manner in which the access code provides security can vary. For example, with a logical memory unit 20 that is a separate computer file, the access code can be a password that must be supplied before reading or writing or otherwise accessing that file in some manner. The access right can be limited to reading only, or limited in some other manner; but preferably includes rights to repeatably read from and write to the logical memory unit 20. The holder of the film unit 10 thus also has control of the photofinishing parameter choices provided by the logical memory unit 20. Referring specifically to FIG. 9, the film unit is prepared and the access code is generated (404). A logical memory unit having an access right secured by the access code is allocated (604) to the film unit. This allocation can use an identifier in the manner above described. The access code is recorded (412) for inclusion with the film unit. This recording can be on the film unit, packaging for the film unit, a slip of paper or other addenda, or in some other manner that provides access to the user of the film unit; but otherwise maintains secrecy. The film unit is sold or otherwise transferred (406). Photofinishing parameters can be posted (214) to the logical memory unit before or after vending (406) or both. The access code is transferred (414) with the film unit. The film unit is used to capture (216) images and the images are later photofinished (218) in accordance with the photofinishing parameters in the respective logical memory unit at the time of photofinishing. It is highly preferred that the access code be only available to the film unit purchaser or transferee after transfer and that write access rights controlled by the access code not be retained by the producer after transfer of the film unit and access code.

To prevent inadvertent disassociation of the access code 128 and film unit 10, it is preferred that the access code 128 is recorded on the film unit 10 independent of the image store, that is, independent of the film or for a digital unit, independent of the digital storage area. The access code 128 can be a human readable password 132, such as a series of alphanumeric characters, that is keyed in when the look-up table 12 is accessed. The access code 128, in this case, can be recorded on the film unit 10 in the same manner as the identifier 42. An advantage of this approach is that an ordinary personal computer can be used as an input device 16. A shortcoming of this approach is that it is difficult to record the password on the film unit 10 so as to be readily available to the holder of the film unit 10 and simultaneously unavailable to other parties. The access code 128 can be provided on a slip of paper 134 or the like, supplied with the film unit 10, but this presents a risk that, over time, the access code 128 will be lost by the user.

The access code 128 and identifier 42 can both be recorded on the film unit 10 or on a container for the film unit 10 in human and machine-readable form. Other forms of identification, such as a credit card, may be required for changes in parameters that would cause the user to incur an additional charge. The access code 128 can be recorded on the film unit 10 in a non-public machine-readable form. The identifier 42 is preferably also machine-readable. It is convenient if the identifier 42 is also human readable.

Reading a machine-readable access code 128 requires the use of an input device 16 having a suitable detector 62. It is also preferred that the access code 128 is embedded in the film unit 10, that is, recorded in a manner that is not alterable without damage to the film unit 10. For example, an embedded access code 128 can be provided in a non-alterable magnetic stripe 136 on the exterior of the film unit 10 in the same manner that magnetic stripes are commonly provided on credit cards. An embedded access code 128 can similarly be provided in an electronic memory component or other local data memory 114 attached to the exterior of the film unit 10 or mounted in the interior of the film unit 10 and accessible through electrical connections. In FIG. 10, the film unit 10 is a one-time use camera 24, which has a magnetic stripe 136 on the exterior of the camera body 26. The camera body 26 is cut-away to show a film cassette 40 that also has a magnetic stripe 136. Both magnetic stripes 136 have an access code 128 for the same logical memory unit 20. The camera body 26 and film cassette 40 each also have an identifier 42 and indicia 100, which indicates that the film unit 10 has an access code 128. In FIG. 10, the indicia 100 is the phrase "access-coded".

Access codes 128 can be provided on both the film unit 10 and on packaging 50, in the same manner as identifiers 42, but this presents a risk that secrecy of the access code 128 will be lost when the packaging 50 is discarded.

The film unit 10 and its logical memory unit 20 are utilized as previously discussed, except that the access code 128 must be generated and recorded in the film unit 10 and look-up table 12 and the access code 128 must be recognized for access to the look-up table 12.

The access code 128 for a particular film unit 10 can be generated before or after allocation of a logical memory unit 20 to the film unit 10. It is preferred that embedded access codes 128 be generated and recorded in the film unit 10 during manufacture of the film unit 10. It is also preferred that identifiers 42 be generated and logical memory units 20 be allocated during manufacture.

The label number, access code, and identifier can all be fully discrete from each other. Alternatively, a single alphanumeric string or the like, can act as label number, identifier, and access code. Intermediate states are likewise both possible and practical. For the purposes of explanation, in the figures, the access code is generally separate from the identifier and the label number is also separate.

Figure 12:
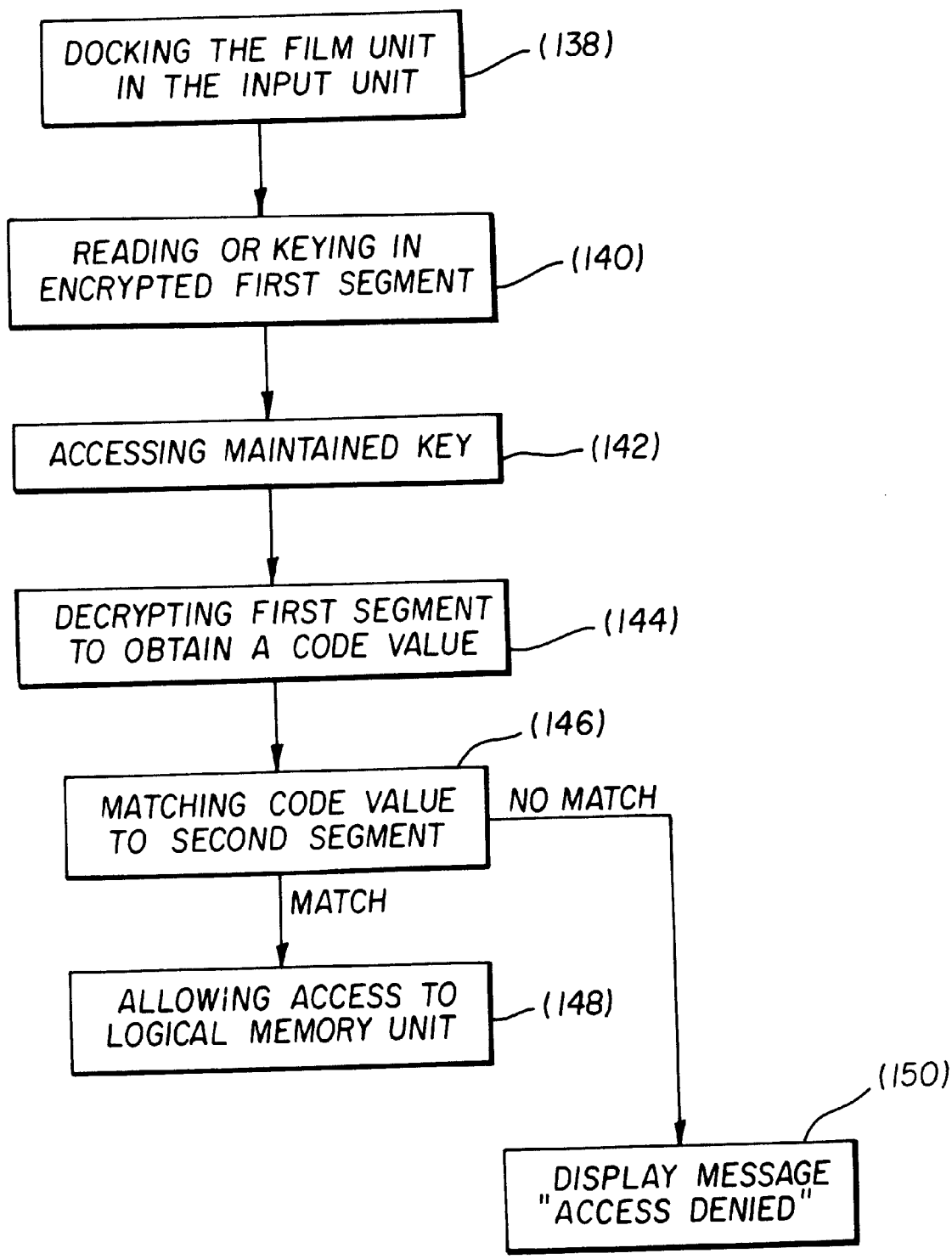
FIG. 12 is a diagram of an embodiment of the secure database access method that comprises the achieving access step of FIG. 11.

Referring now to FIG. 12, the access code 128 can have two segments or parts, one of which is an encryption of the other. The identifier 42 of the film unit 10 can include one or both of the segments. The look-up table 12 only grants the user or other holder of the film unit 10 access to the remotely stored data in the look-up table 12 if a code value obtained by decrypting a submitted first segment, matches a second segment. In accessing the look-up table 12, the film unit 10 is registered and the encrypted first segment of the access code 128 is detected. The registering preferably includes docking (138) the film unit 10 in an input device 16 and reading (140) the first segment, for reading the identifier 42. The maintained key 152 is then accessed (142). The first segment is then decrypted (144) and matched (146) to the second segment. If a match is found, then access to the logical memory unit 20 for the respective film unit 10 is allowed (148). If no match is found then access is denied (150). The same steps are followed for docking in an entry station 92 of a photofinishing unit 14. In the photofinishing unit 14, the film unit 10 is culled if access is denied (150) and the film unit 10 is handled separately.

Figure 11A:
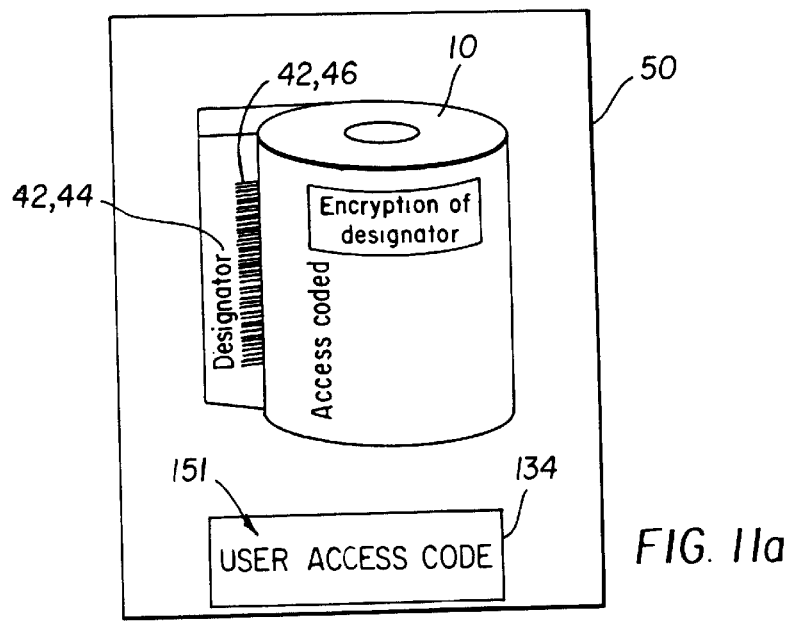
FIG. 11 is a diagrammatical view of a system including a film unit access coded for user and producer subunits of a logical memory unit.
Figure 11B:
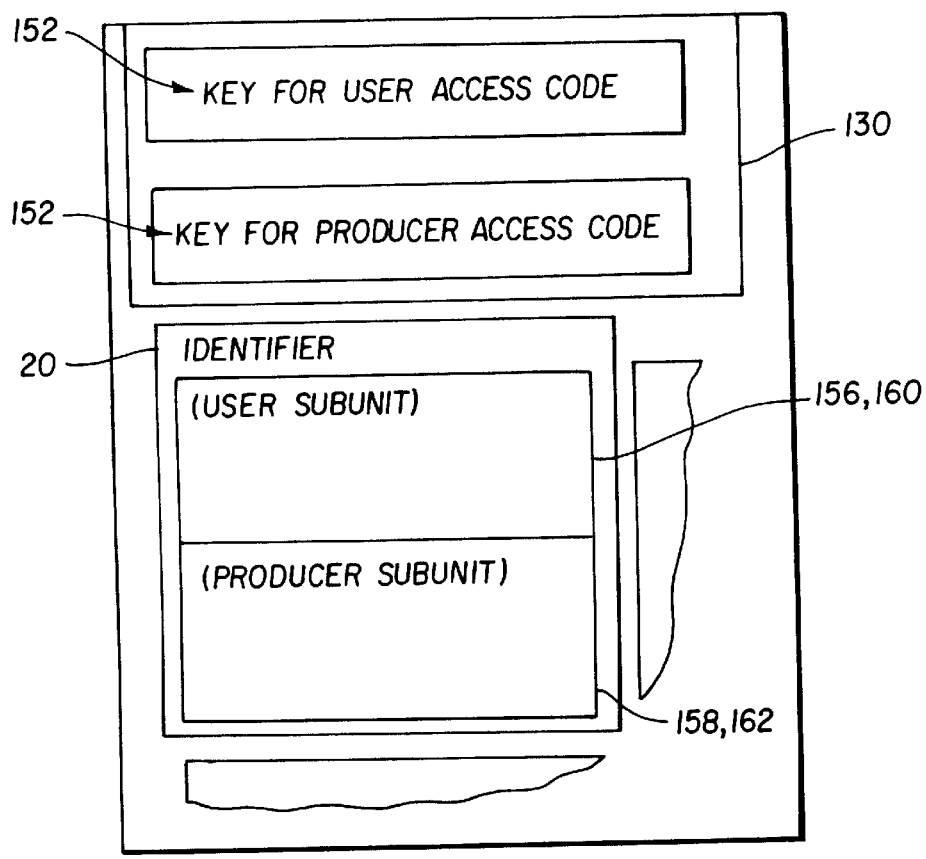
Figure 11C:
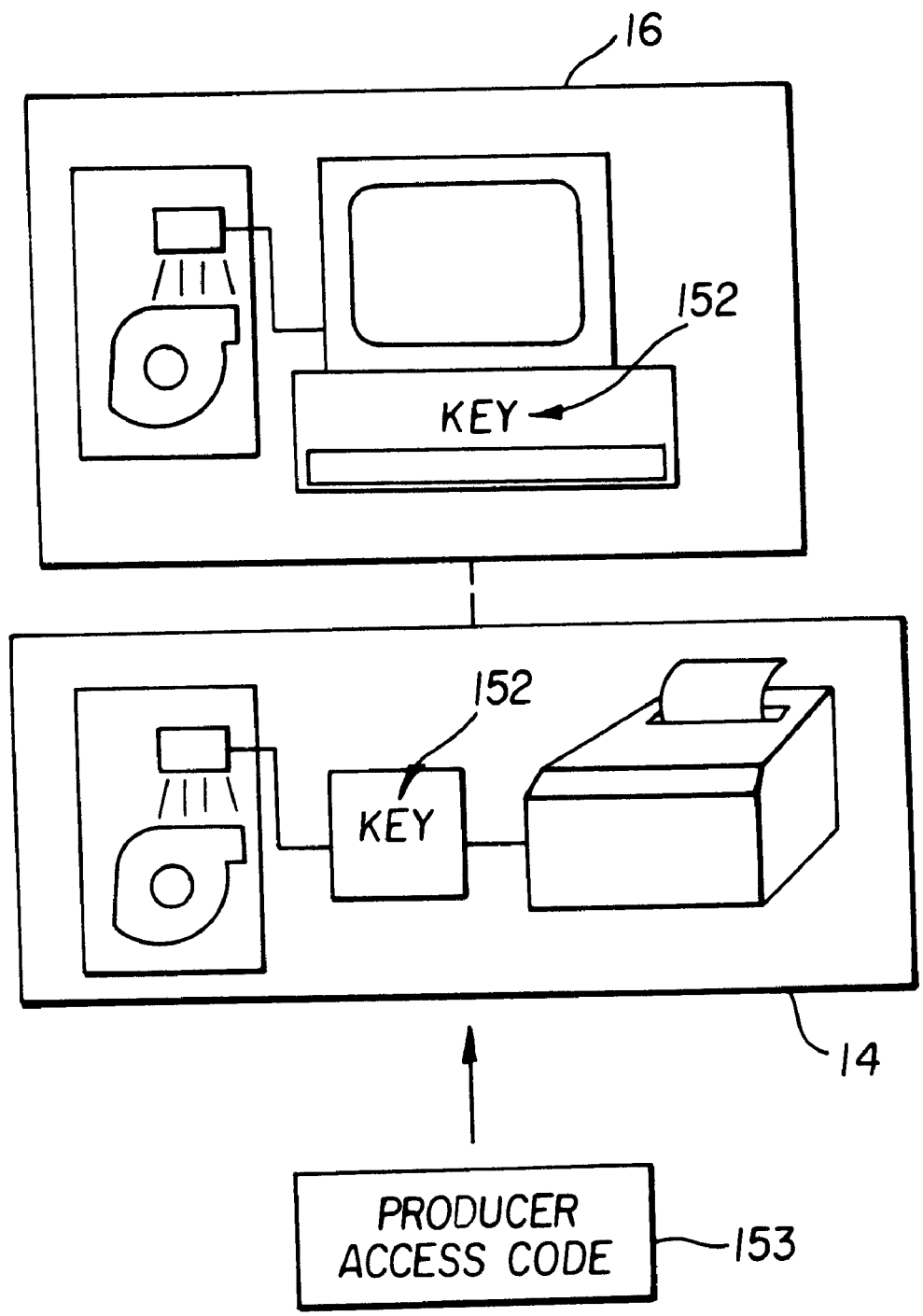

The locations and use of the different segments of the access code 128 vary in different embodiments. In some embodiments, both first and second segments of the access code 128 are present on the film unit 10. Referring now particularly to FIGS. 10–12, the second segment of the access code 128 is the label number of the identifier 42 and is recorded in human-readable and machine-readable form on the exterior of the film unit 10. The encrypted first segment of the access code 128 is recorded on the exterior of the film unit 10 in machine-readable form only. The segments can also be recorded on the film unit 10 in other manners. For example, the first segment can also be recorded in human-readable form 44. The use of the first and second segments can also be reversed; that is, the first segment can be recorded on the film unit 10 as the label number. This approach is only desirable if the ciphertext used in the encrypted first segment is limited to ordinary alphanumeric characters.

In particular embodiments, the key 152 that is used to decrypt the encrypted first segment of the access code 128 is not recorded on the film unit 10. Referring to FIG. 11, the key 152 can be maintained and supplied by the input or photofinishing unit 14. Referring again to FIG. 11; the key 152 can alternatively be maintained and supplied by a gatekeeper 130, a portion of the look-up table 12 that controls access to the logical memory units 20. The decryption can be performed in the look-up table 12 or, alternatively, in the input device 16 and photofinishing units 14. It is convenient if the decryption is performed in the same component that supplies the key. In either case, upon decryption, the first segment is matched to the second segment. The second segment is read from the film unit 10 either just prior to matching or at some earlier time. When a match is found, access to the respective logical memory unit 20 is granted, either directly by a gatekeeper 130, or by means of an authorization signal that is sent to the main portion of the look-up table 12.

The key 152 for the encrypted first segment can be based on a symmetric encryption-decryption algorithm, in which the same key 152 is used for encryption and decryption; or on an asymmetric encryption-decryption algorithm, in which different keys 152 are required for encryption and decryption. The latter is preferred, since the encryption key 152 can be closely held. This reduces the risk that the encryption key 152 will be misappropriated and used to produce counterfeit film units 10, which could cause the corruption of valid information in logical memory units 20 in the look-up table 12. The key 152 can also take the form of a codebook, a table linking respective first and second segments, which may or may not be cognates.

Figure 13:
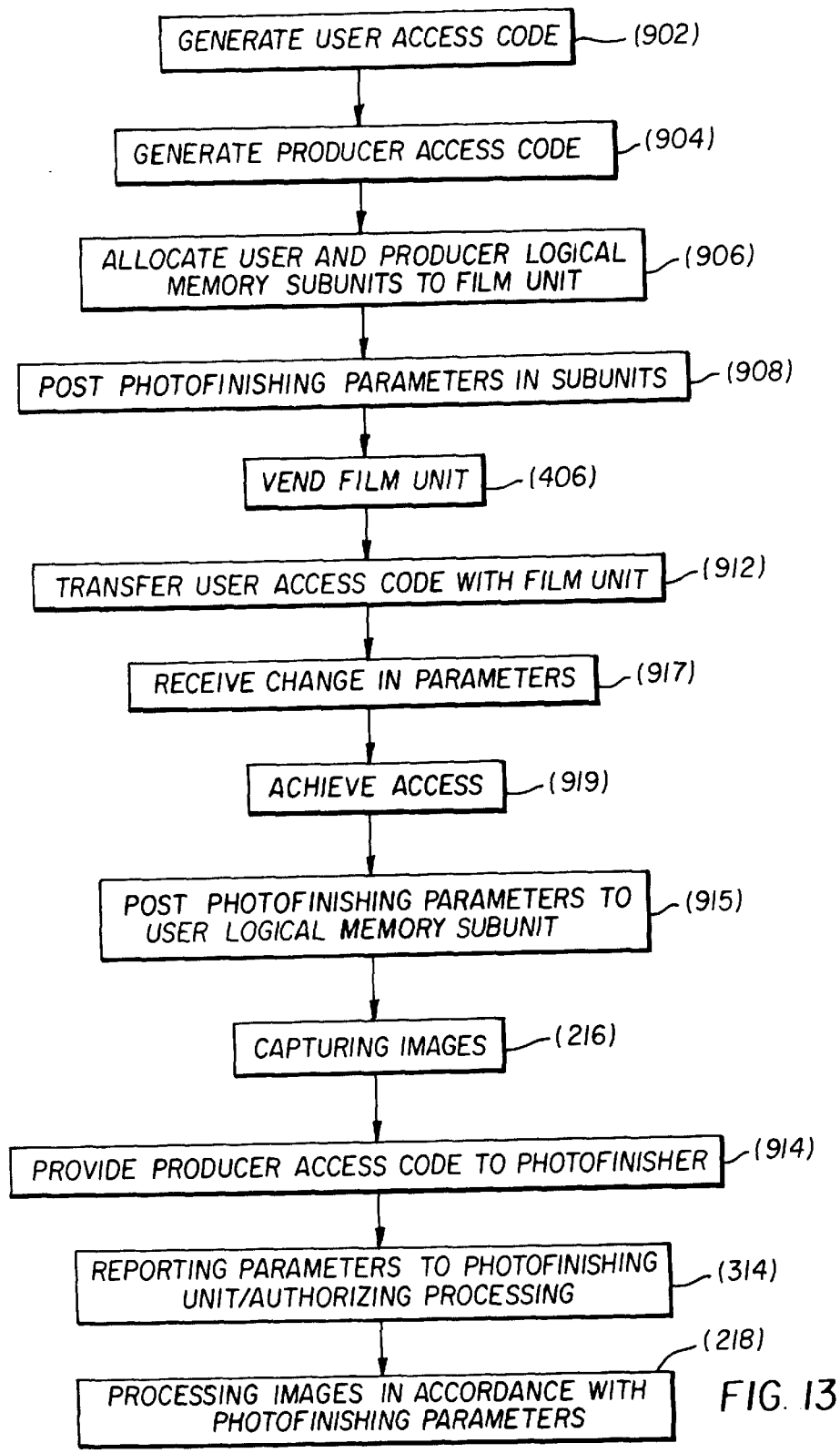
FIG. 13 is a diagram of an embodiment of the method for handling user and producer customization data
Figure 14:
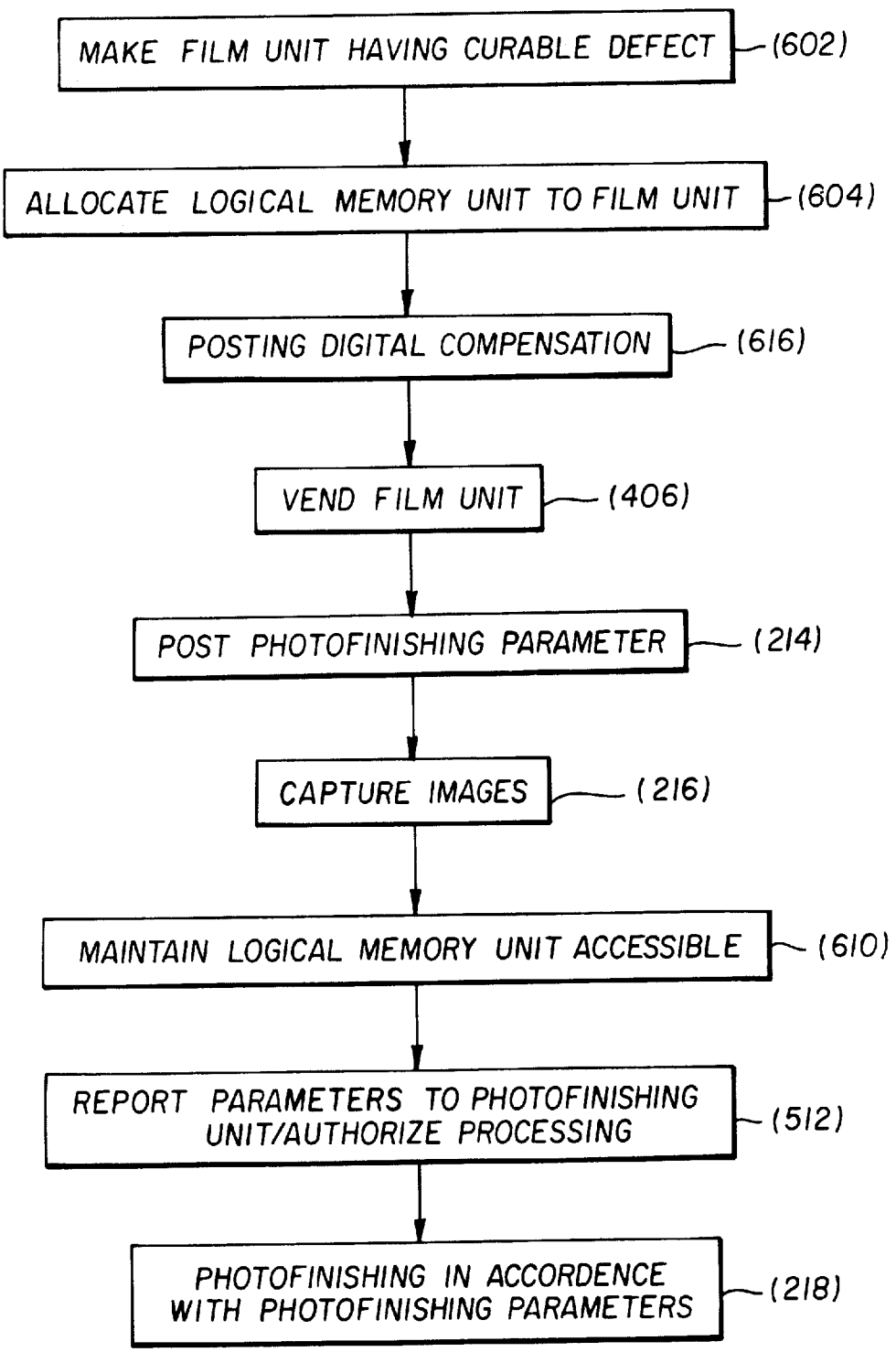
FIG. 14 is a diagram of an embodiment of the method for compensating for film unit defects.
Figure 15:
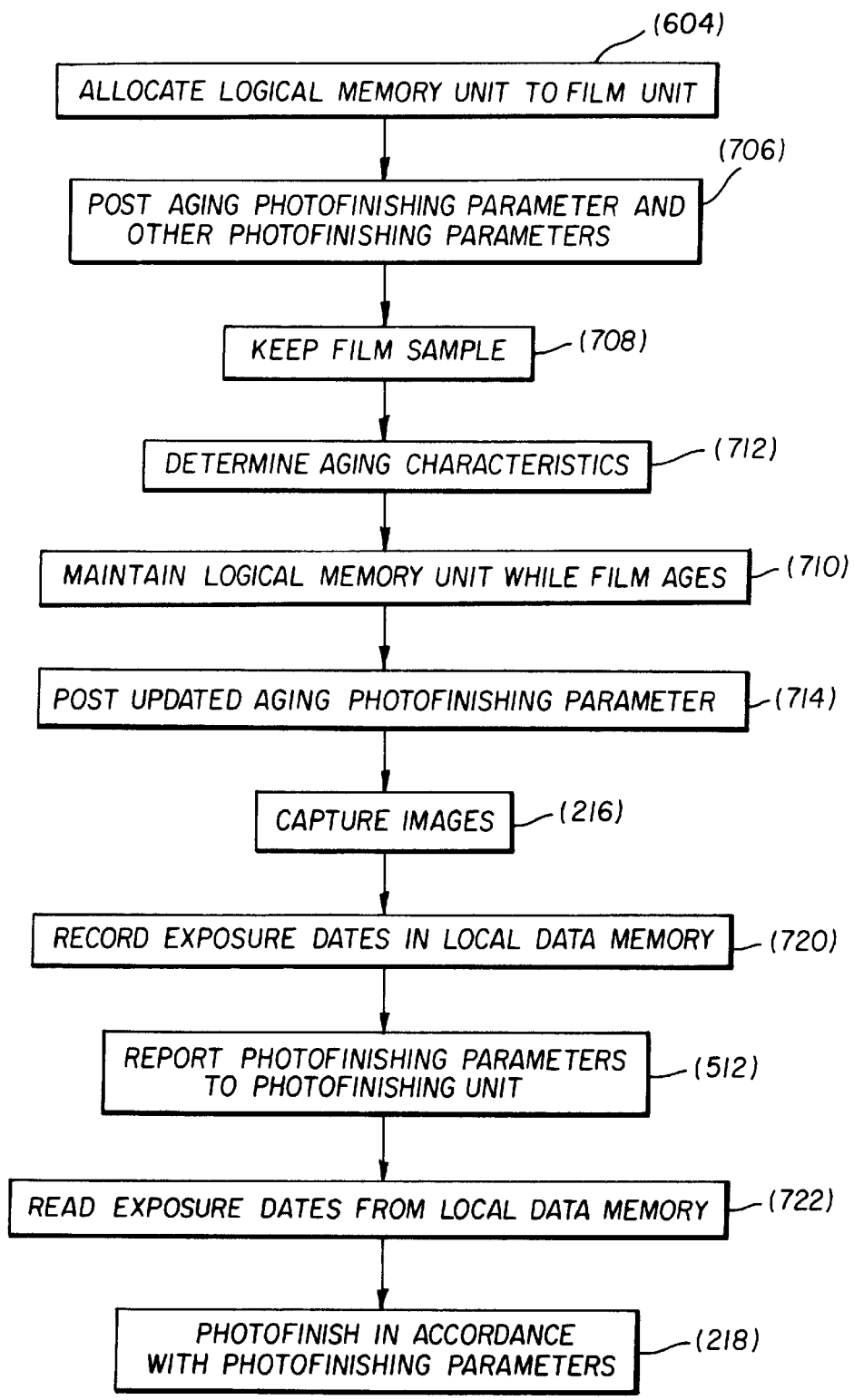
FIG. 15 is a diagram of an embodiment of the method for keeping photographic film current and extending the useful life.
Figure 16:
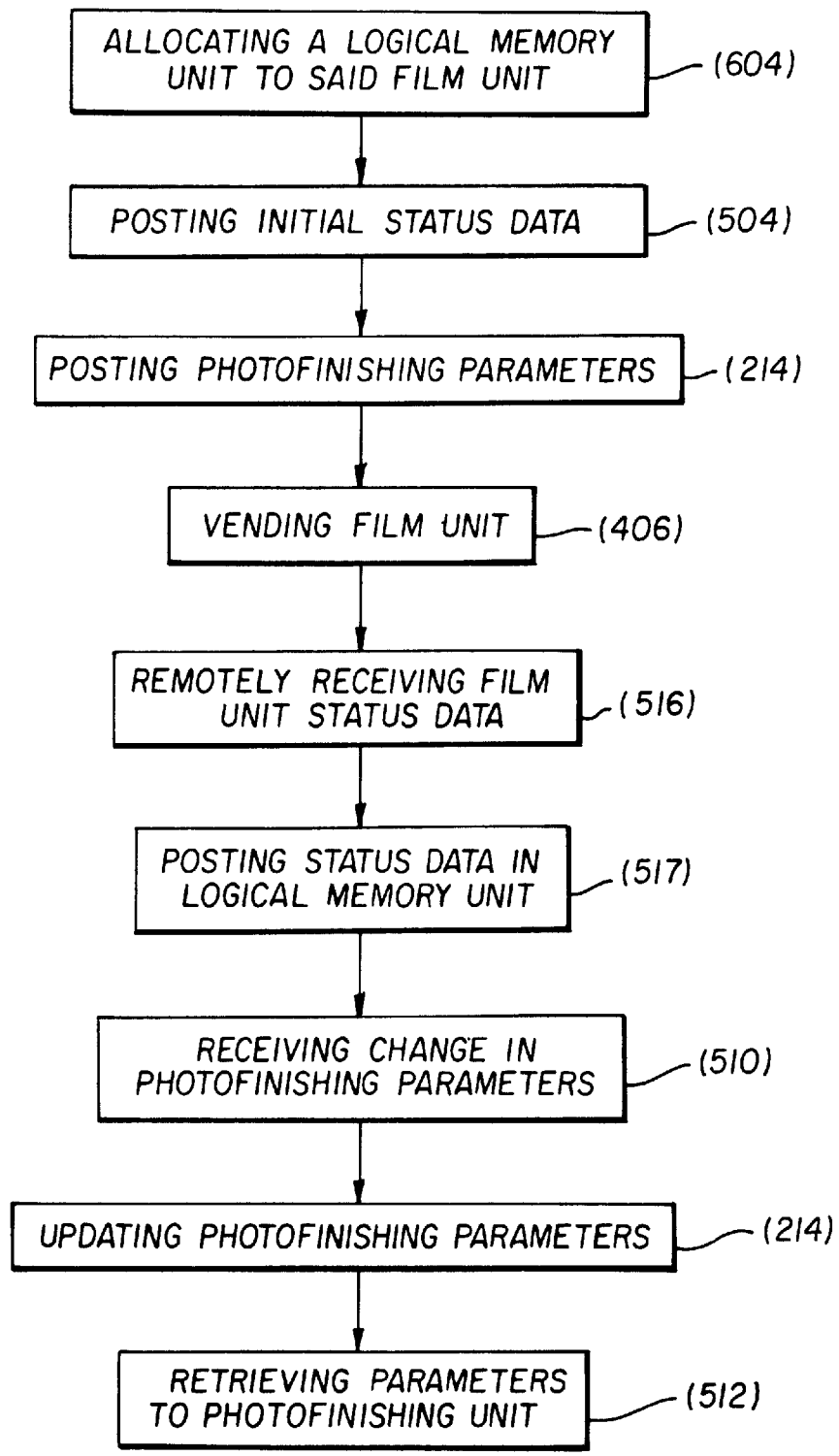
FIG. 16 is a diagram of an embodiment of the method for tracking the life cycle of film units.

Referring now to FIGS. 14–15, in some embodiments, the film unit 10 bears only the encrypted first segment. The second segment is present only in the look-up table 12. The film unit 10 can include a serial number or label number that is not related to the access code 128 by encryption or decryption. Referring to FIGS. 12 and 13 and 15, the first segment can be decrypted by a key 152 retained in a gatekeeper 130, input device 16 or photofinishing unit 14. The code value produced by the decryption is then transmitted to the main portion of the look-up table 12 and is matched to the second segment present in the look-up table 12.

In the system of FIG. 1, the entry for each film unit 10 in the look-up table 12 includes the identifier 42 and no additional information or one or more changes from default photofinishing parameters 52. In an alternative system having the look-up table separated into subunits, each logical memory unit 20 in the look-up table 12 includes two or more subunits, each having a different class of information. The subunits can be logical or physical partitions and can be differentiated from each other in the same manner as the logical memory units 20. Separate user and producer subunits are convenient, but any number of subunits can be provided for any purpose. For convenience, this system and method is generally discussed herein in terms of the user and producer subunit, but it will be understood that these terms are descriptive, but not limiting.

Referring to FIGS. 11 and 13 the film unit is manufactured, user and producer access codes 151,153 are generated (902)(904) and a logical memory unit having user and producer subunits is allocated (906) to the film unit. Photofinishing parameters are designated (908) as previously described herein and the film unit is sold or transferred (406). The user access code is transferred with the subunit (912) and the film unit is used to capture (216) images. The logical memory unit is maintained (915) and changes in parameters can be posted to the logical memory unit (917) from the user after access is achieved (919) using the access code. The film unit is submitted for processing, photofinishing parameters are reported (914) to the photofinishing unit, and the film unit is processed (916) in accordance with the parameters. Prior to the completion of processing, the producer access code is provided (914) to the photofinishing unit. The access code can be in the film unit, such as being recorded optically on the undeveloped filmstrip for reading after film development. The producer access code can also be supplied separately. The photofinishing unit can be provided with a list of access codes on a regular basis, a common code can be used for a series of film units, or the access codes could be sent individually as needed. The photofinisher can instead be granted read access to the producer subunit without a specific code. If desired, the photofinishing unit can be allowed to write only, to a separate photofinisher subunit of the logical memory unit, information about the photofinishing and the status of the film unit as having been developed or otherwise photofinished.

The user subunit 156 has a class of information, referred to here as "user data 160", that consists of user alterable changes from default photofinishing parameters 52 like those previously discussed. The producer subunit 158 has a second class of information, referred to here as "producer data 162", that is subject to modification only by the producer or producer's designee. This class includes standard processing data like film type and number of images; remedial image customizations; and historical information useful for market studies, such as dates of film manufacture and initial user customization.

TABLE 2

| Event | User data 160 in user subunit 156 | Producer data 162 in producer subunit 158 |
|---|---|---|
| Origin | Identifier 42: ABCDEF123456 Processing parameters: default Promotion: poster (limited time) | Identifier 42: ABCDEF123456 Film subtype: A Defect: camera lens-J8 Census data: batch-13579 |
| Vending | Identifier 42: ABCDEF123456 Options: sepia User info: John Doe, 1 Main St., The City Promotion: poster (limited time) | Identifier 42: ABCDEF123456 Film subtype: A Defect: camera lens-J8 Census data: batch: 13579, sale-2468 |
| Return for processing | ID: ABCDEF123456 User info: John Doe, 1 Main St., The City Promotion: poster (limited time) Second set to: My friend, 2 Main St., The City Second set options: b & w | ID: ABCDEF123456 Film subtype: A (age state 1) Defect: camera lens-J8 Census data: batch: 13579, sale-2468, processing-3456 |
| Reprints 1 | Identifier 42: ABCDEF123456 Options: Image #3, #7 color (default), size 6R, User info: John Doe, 1 New St., The City Promotion: (expired) | Identifier 42: ABCDEF123456 Film subtype: A (age state 2) Defect: camera lens-J8 Census data: batch: 13579, sale-2468, processing-3456, later sales-5678 |

Table 2 provides an example of the types of data that could be stored in user subunits 156 and producer subunits 158. The producer subunit 158 can be stored in the look-up table 12 in the same manner as the user subunit 156, but can be accessed differently or alternatively can be physically separated in another site or memory device, or the like. In either case, both the user data 160 and the producer data 162 is presented to the processing apparatus when the look-up table 12 is accessed. It is preferred that any possibility of conflicts between user data 160 and producer data 162 be foreclosed. This can be done by limiting available options at the time of user customization, in accordance with prerecorded producer data 162. Suitable software for this function can be provided as a part of the look-up table 12 computer or alternatively in an input device 16. If conflicts are possible between user data 160 and producer data 162, then selection rules can be provided to permit user data 160 or producer data 162 to dominate in appropriate circumstances. More than two classes of information can be provided. For example, users can be allowed to subdivide information and provide limited access to others. A separate subunit and class of information, such as available promotions, can be provided for distributors. A separate subunit and class of information can be provided for unalterable information. This can be used, for example, to record that the film unit 10 was processed. This unalterable subunit can also include permanent customizations of the film unit 10, such as prepaid double prints on all future reprints from that film unit 10.

It is preferred that the two subunits of the logical memory unit 20 for a particular film unit 10 have separate access rights for writing or for both writing and reading. Separate access codes 128, like those previously described, can be supplied for each subunit. The access code 128 for the user data 160 is transferred with the film unit 10 as previously described, but the access code 128 for the producer data 162 is retained by the producer or a designee. The producer access code 128, or an access code 128 for another subunit, can be supplied to a photofinisher or distributor or the like to permit recording of photofinishing information or distribution data or the like. The producer access code 128 and any additional non-user access codes 128 are transferred independent of the film unit 10. The producer access code 128 can be a "master key" usable with any logical memory unit 20; but it is preferred to prevent data corruption, that all access codes 128 have a one-to-one relationship to a single logical memory unit 20 and single film unit 10.

Producer data 162 can be used to authenticate film-type film units 10 and prevent erroneous duplication of identifiers 42 on film units 10. Although the memory allocation may be accessed many times, the filmstrip 36 in the film unit 10 is only developed once. The developing can be used as an authentication event. A second, identically designated film unit 10 requesting services later can flag an error condition that needs investigation and action. This provides a protection against communication errors and against makers of counterfeit film units. The second archive can still be developed, but does not receive the benefits of look-up table information unless the identifier 42 is corrected or the film unit 10 is otherwise designated as a non-duplicate. Some event other than developing can be used as the authentication event. For example, the initial user customization could be utilized. Digital film units 10, obviously require such an alternative authentication event, since they do not require developing.

Referring again to Table 2, a film unit 10 can be customized to compensate for a manufacturing defect in the image capture system, such as a predictable lens defect in a one-time use camera 24, by the use of an appropriate digital image modification. The compensation or cure of the defect may completely remediate the problem, but generally, the compensation or cure is incomplete. The cure can be provided as a "counteractive" photofinishing parameter 52 in a producer subunit 158 of the respective logical memory unit 20. A user subunit 156 can also be provided to allow other customization of the film unit 10, as previously discussed.

Referring to FIG. 14, The film unit is manufactured with the "curable" defect (602). A logical memory unit is allocated (604), the film unit is sold (406), images are captured (608), photofinishing parameters are written (214) to the logical memory unit and reported (512) to the photofinishing unit, and the logical memory unit is maintained (610), and the film unit is photofinished (218) as discussed elsewhere herein. The exception is that a photofinishing parameter is written (616) to the logical memory unit (preferably prior to vending (406)) that includes a digital compensation that is counteractive for the defect in the film unit.

The term "counteractive" refers to a procedure that partially or fully overcomes the defect, either by a direct compensation or indirectly by making the defect less obvious. The counteractive photofinishing parameter 52, like all other photofinishing parameters 52 discussed herein, can directly alter photofinishing equipment parameters or can point to an external database if that is used to automatically or manually alter the photofinishing equipment or procedures as required. The photofinishing parameters 52 can even point to a series of databases and algorithms that are consulted to provide ultimate controls for the photofinishing equipment and procedures. For example, a logical memory unit 20 can provide camera identification that causes photofinishing equipment to consult a camera correction information database that in turn indicates settings for the photofinishing equipment.

The term "image quality defect" and like terms are used herein to refer to one or more impairments of the film unit 10 which are detrimental to the capture of representational images. The image quality defect causes one or more measurable degradations in the quality of a captured image, when compared with the image which would be obtained in the absence of the defect. The image quality defect is selected so as to provide a net benefit to the imaging system. For example, the cost of picture preparation and the weight of the camera can be reduced by use of simple and lightweight, but optically defective lenses. The defect in each camera is within a predetermined tolerance of a predefined nominal defect. The memory allocations associated with the identifiers 42 for the cameras each include a processing parameter that designates a digital compensation that overcomes, or at least remediates, the nominal defect. The "image quality defect" includes defects that do not directly cause image degradation in all photofinishing devices, but can cause image degradation in some devices unless appropriate countermeasures are taken. The "image quality defect" also includes intermittent or otherwise variable defects that will only appear under some conditions of camera usage, such as red eye due to the presence of a flash unit too near a camera lens.

The term "quality degradation" and like terms are used herein to refer to deleterious changes in measurable parameters of the captured image relating to quality. Those parameters quantify sharpness, spatial frequency modulation response, calorimetric matching, and achromatic gray scale matching.

Each of the quality degradation parameters can be measured in various ways. Sharpness is generally expressed as acutance. "Acutance" is a measure of the apparent sharpness of edges in an image and is defined, as to a particular edge, as the average squared rate of change of the density across the edge divided by the total density difference from one side of the edge to the other side of the edge. The spatial frequency modulation response is generally expressed as the modulation transfer function at one or more defined frequencies. Colorimetric matching can be found by reference to a standard. Brightness can be expressed as the radiant intensity of light reflected from a print as measured under specified angle and illumination conditions.

The quality degradation is a characteristic of the captured image as a whole, but can be uniform for an entire image or can vary geometrically across the two dimensions of the image. Degradations can be categorized as: point degradations, spatial degradations, chromatic degradations, and degradations that are combinations thereof.

The term "point degradation" is used herein to refer to alterations in image information in which a point in the captured image is subject to one or more modifications that are independent of the modifications of the other points in the captured image. Categories of point degradations include: geometric coordinate transformations in which information is relocated from one point to another, and additive and multiplicative effects in which a numerical value of information at a point is increased or decreased. Examples of exposure system and capture system features which can cause degradations that are predominantly point degradations are film grain and lens tube shading.

The term "spatial degradation" is used herein to refer to alterations in image information in which a point in the captured image is subject to one or more modifications that are dependent of the modifications of the other points in the captured image. These alterations are also referred to as being subject to integration or spatial smearing. Categories of spatial degradations include: diffraction-limited optical systems; first, second, and higher-order optical system aberrations; defocusing; and object-film plane image motion blur.

The term "chromatic degradation" is used herein to refer to alterations in image information in which a point in the captured image is subject to one of more modifications in a numerical value of one or more of the axes of a colorimetric space.

The image quality defect is intentional and preplanned prior to manufacture of the camera. The manufacture of camera parts within close tolerances to improve image quality is well known to those of skill in the art. In the invention, manufacturing processes are tightly controlled so that each camera, within a family of cameras, has the same image quality defect, that is, a defect that is within close tolerances of a nominal image quality defect and produces an image quality degradation within similar close tolerances. The image quality defect and resulting image quality degradation are thus known and identified in each camera when the camera is made and the defects and image quality degradations are thus uniform throughout the family of cameras.

The nominal image quality defect is selected so as to be fully, or at least partially, curable as a part of a specific digital image manipulation procedure, also referred to herein as "digital compensation", included in processing provided subsequent to exposure of a number of images representing the storage capacity of the film unit 10. Other digital image manipulation procedures, referred to hereafter as "responsive digital manipulations" and "editorial manipulations", may also be provided as a part of the post-exposure processing. In responsive digital manipulations, the image is perceptively improved based upon knowledge of the content of the captured image or the conditions of image capture. This contrasts with digital compensation, which is preplanned along with the image quality defect. In editorial manipulations, the captured image is modified without reference to optical quality. For example, the captured image can be cropped and sections enlarged to provide different image formats and magnifications. Similarly, the image can be changed to no longer be representational of the light image originally captured. For example, color images can be remapped as gray scale images or image features can be modified, rearranged, or replaced to meet a particular artistic standard. In most cases, it is preferred that responsive digital manipulations and editorial manipulations be performed after digital compensation. An exception would be where a portion of the captured image was cropped.

The terms "curable" and "cure" and the like, are used herein to describe the effects of digital compensation that provides a perceived improvement in an image. The digital compensation may completely reverse the effect of the degradation; that is, the digital compensation may be the inverse of the image degradation caused by the defect. Alternatively, the digital compensation may only partly reverse the degradation or only reduce the perception of the defect. For example, the digital compensation can blur an image captured on photographic film to reduce visible "graininess" caused by large and irregularly sized film grains. Different digital compensation procedures can be combined to accommodate degradations caused by multiple image quality defects in a camera. It will be understood that the term "image quality defect" and like terms used herein is inclusive of multiple defects; unless, in context, a single defect is indicated.

Examples of digital compensation procedures include: tabular adjustment of parameters, stretching or shrinking a range of a parameter, histogram equalization, assembly and balancing of mosaic images, aspect ratio correction, deskewing, and registration (rubber sheet stretching). The latter refers to correction of geometric coordinate transformations by remapping values in congruence with a predetermined point degradation transformation function for a nominal average of the capture system. Geometric coordinate transformations include rotation, translation, and anisotropic scale changes.

Examples of responsive digital manipulations include digital edge enhancement, smoothing and blurring, and sharpening procedures provided iteratively through human mediation or an automatic image content responsive algorithm.

The processing parameter does not depict the actual defect in the camera, but rather categorizes the actual defect as being subject to cure by the same digital compensation as a particular nominal defect. The processing parameter is thus associated with a particular nominal image quality defect and with the appropriate digital compensation for that nominal defect. The association can be direct or indirect. The processing parameter can be a standardized designation for a particular nominal imaging quality defect. This requires the availability to the digital processor 82 of a set of digital compensation subroutines or the like, which are indexed to respective nominal image quality defects. The processing parameter can instead be a standardized designation for the digital compensation subroutine rather than the corresponding defect. The processing parameter can be a modification of such a designation. For example, the processing parameter could be the product of digital compression of a standardized designation. The processing parameter can be the appropriate digital compensation subroutine for a particular defect, or can be a set of instructions to the digital processor 82 as to generating an appropriate digital compensation subroutine.

Digital image alterations can be roughly categorized as: orthoscopic and non-orthoscopic. In orthoscopic alterations, the final image remains representational of all or part of the original light image. The original light image is only altered by zooming, cropping, rotating, or some combination of these procedures prior to output of a final image. A plurality of non-modifying image modification states can be included, if desired to provide for different print formats or other zooming and cropping functions. In non-orthoscopic alterations, there is an image modification; that is, the image is non-orthoscopically altered prior to output of a final image. Orthoscopic image modifications can also be included with non-orthoscopic modifications. The nature of the non-orthoscopic image modification states available is likely to be determined as a matter of user preference and the practical limitations of printing equipment, such as color gamut. It is expected that one major preference will be for transmogrifications, alterations that are unsubtle (and often grotesque or humorous) and at the same time retain sufficient information content from the captured image so as to allow immediate user recognition of the subject matter originally captured. Another preference is expected to be for what can be referred to as "artistic effects", modifications that resemble stylistic changes in information content used in painting and other art forms.

Referring to Table 2 and FIG. 15, the system can be used to modify photofinishing parameters 52 to compensate for age related degradation of photographic film. A logical memory unit is allocated (604) to the film unit. Photofinishing parameters are designated (706) and an aging parameter for the category of film used in the film unit is initially written. The "aging parameter" is referred to in the singular as a convenience. Necessary information for aging compensation is expected to be voluminous. The "aging parameter" can be a single pointer or series of pointers to separately stored information or the necessary information can be written directly in the logical memory unit. The initial aging parameter can be a default, such that an empty record in the logical memory unit 20 is a recording of the default aging parameter. The logical memory unit is maintained (710) available for writing by input devices and reporting to photofinishing units.

Samples of the film category are kept (708) by the producer under controlled conditions that mimic expected aging in use. Aging can be measured separately for developed and undeveloped film. At intervals during the aging of the film samples, adjustments are determined (712) in the aging parameter that would counteract the effects of the observed aging. The aging parameter, in the producer subunits 158 of respective logical memory units 20, is then updated (714) to indicate current aging data. Other photofinishing parameters are written to the logical memory units before and after sale of the film units as earlier discussed. The film units are sold and used. Images are captured (216), parameters are reported (512) to the photofinishing unit, and the film is photofinished (218) in accordance with the photofinishing parameters including the aging parameter. The aging parameter can also be used in subsequent photofinishing (218) to counter aging of film after development.

This approach to countering aging is necessarily inexact, since environmental conditions effect aging and actual conditions of film use and storage are unknown. On the other hand, some aging of film is unavoidable. That aging could be compensated for in all cases. Aging compensation can also be provided, if desired, for anticipated average consumer or professional use of film units. Additional aging remediation can be provided as a user selected photofinishing parameter 52.

In a particular embodiment of the method for compensating for film aging, some film samples are withdrawn at intervals during aging and are exposed with standardized exposures and are developed at further intervals during aging to provide individualized aging characteristics, at the various time intervals, for unexposed film units, exposed and undeveloped film units, and developed film units. The aging characteristics are adjustments in photofinishing parameters to counteract the effects of the observed aging under the expected conditions of use. The film units are sold and used as above-described; except that exposure dates are recorded (720) in local data memory 114 in cameras that can capture date of exposure for each image captured. Film units from such cameras are developed and the image exposure dates are read (722) from the local data memory. The photofinishing unit accesses the respective logical memory unit and obtains the aging parameter. The countermeasures can be individually assigned by the look-up table, but it is preferred that the individual countermeasures are assigned and applied to respective images by the photofinishing unit. Separate countermeasures are applied to individual images based on the respective image exposure dates. It is expected that countermeasures will be assigned on the basis of calendar quarters or even longer time periods. Thus image exposure dates recorded in the local data memory can be limited in the same manner, if desired. For example, days of the month could be left unrecorded. The photofinishing unit can post to the logical memory unit that aging countermeasures were used. Specific information about countermeasures used can be retained in the look-up table to aid the user in making decisions about future photofinishing.

The system can be used to track status data for a film unit. For example, a manufacturer can keep a record in the look-up table of manufacture information for a film unit, and then have information added to that record that relates to distribution and usage of the film unit. The information from different film units can be compiled and used to tailor future film unit manufacturing to better match actual product usage. For one-time use cameras, information is also available to better assess details of the used camera bodies that will become available for recycling in the future. The A film unit is manufactured and a logical memory unit is allocated (604) to the film unit. Initial status data is written (504) to the logical memory unit. This data is likely to include date, time, and place of manufacture; date of distribution, and the like. Initial photofinishing parameters are also designated (214). The logical memory unit can have multiple subunits as previously discussed. Identifiers, access codes, and other features of the film units are provided as previously discussed. After vending (406), the film unit is used as previously discussed. Photofinishing parameters are entered or modified by the user and received (510) by the look-up table and later reported (512) to a photofinishing unit, as earlier discussed. When the look-up table is contacted by an input device, additional status data is received (516) by the look-up table and recorded (517) in the logical memory unit. For example, the input device can communicate the date and time a logical memory unit is accessed and prerecorded "redentials" for the input device, such as location, serial number, and the like. If desired, the receipt of the status data can be made a mandatory precursor to the updating (214) of photofinishing parameters in the logical memory unit. The receipt of changes in photofinishing parameters, recording, receipt of status data, updating, and reporting steps can be repeated for each time the logical memory unit is accessed by an input device or by input devices and photofinishing units. Status data in the logical memory units can be collected, maintained, cleared, and the like whenever convenient to the manufacturer.

The invention has been described in detail with particular reference to certain preferred embodiments thereof, but it will be understood that variations and modifications can be effected within the spirit and scope of the invention.

What is claimed is:

1. A method for handling photofinishing customization data for a plurality of film units, each said film unit having a unique identifier, said film units being usable for capturing images, said method comprising the steps of:

allocating a different logical memory unit to each said film unit, said logical memory units being remote from said film units, said logical memory units each indicating the identifier of the respective said film unit and a plurality of photofinishing parameters for the respective said film unit;

receiving a remotely input change in at least one of said photofinishing parameters for at least one of said film units;

writing said change in the respective said logical memory unit; and processing the images responsive to said photofinishing parameters in the respective said logical memory units.

2. The method of claim 1 further comprising maintaining said logical memory units accessible to one or more repeats of said writing step.

3. The method of claim 1 further comprising reporting said photofinishing parameters to a photofinishing unit.

4. The method of claim 3 wherein said reporting further comprises authorizing said photofinishing unit to proceed.

5. The method of claim 3 further comprising maintaining said logical memory units accessible to one or more repeats of said writing step and one or more repeats of said reporting step, in any order.

6. The method of claim 1 wherein said identifiers are written in respective said logical memory units.

7. The method of claim 1 wherein said logical memory units have address paths corresponding to respective said film unit identifiers.

8. The method of claim 1 wherein said receiving and writing are prior to said capturing.

9. The method of claim 1 wherein said logical memory units are in a networked computer.

10. The method of claim 1 wherein said film units are one-time use cameras.

11. A method for handling photofinishing customization data for a plurality of film units, each said film unit having a unique identifier, said method comprising the steps of:

preparing the film units for use in capturing images;

allocating a different logical memory unit to each of said film units prior to said capturing, said logical memory units being remote from said film units, said logical memory units each indicating the identifier of the respective said film unit;

writing at least one photofinishing parameter to the respective said logical memory unit of each said film unit;

vending said film units for use in capturing images;

processing said images responsive to said photofinishing parameters in the respective said logical memory units; and maintaining said logical memory units accessible to one or more repeats of said writing step, at any time between said vending and said processing.

12. The method of claim 11 wherein said writing is prior to said vending and said method further comprises repeating said writing after said vending.

13. The method of claim 11 further comprising reporting said photofinishing parameter to a photofinishing unit.

14. The method of claim 11 further comprising the steps of:

capturing a plurality of images in at least one of said film units.

15. The method of claim 11 wherein said logical memory units are in a networked computer.

16. The method of claim 11 wherein said film units are one-time use cameras.

17. A method for handling photofinishing customization data for a plurality of film units used for capturing images, said film units each having a unique identifier, said method comprising the steps of:

allocating a different logical memory unit to each said film unit prior to said image capture, said logical memory units being remote from said film units, said logical memory units each indicating the identifier of the respective said film unit and a plurality of photofinishing parameters for the respective said film unit;

receiving a remotely input change in at least one of said photofinishing parameters for at least one of said film units;

writing said change in the respective said logical memory unit; and processing said images responsive to said photofinishing parameters in the respective said logical memory units.

\* \* \* \* \*